(12) United States Patent
Yamaguchi et al.

(10) Patent No.: US 10,760,687 B2
(45) Date of Patent: Sep. 1, 2020

(54) SEAL RING AND SEALING DEVICE

(71) Applicant: TPR CO., LTD., Tokyo (JP)

(72) Inventors: Hitoshi Yamaguchi, Tokyo (JP); Teppei Oga, Tokyo (JP)

(73) Assignee: TPR CO., LTD., Tokyo (JP)

( * ) Notice: Subject to any disclaimer, the term of this patent is extended or adjusted under 35 U.S.C. 154(b) by 89 days.

(21) Appl. No.: 15/742,451

(22) PCT Filed: Mar. 13, 2017

(86) PCT No.: PCT/JP2017/010032
§ 371 (c)(1),
(2) Date: Jan. 5, 2018

(87) PCT Pub. No.: WO2018/167828
PCT Pub. Date: Sep. 20, 2018

(65) Prior Publication Data
US 2019/0085981 A1 Mar. 21, 2019

(51) Int. Cl.
*F16J 15/3272* (2016.01)
*F16J 15/3284* (2016.01)
(Continued)

(52) U.S. Cl.
CPC ....... *F16J 15/3272* (2013.01); *F16J 15/3284* (2013.01); *F16J 15/441* (2013.01);
(Continued)

(58) Field of Classification Search
CPC ...... F16J 9/20; F16J 9/22; F16J 15/164; F16J 15/3272; F16J 15/3284; F16J 15/441; F16J 15/48
See application file for complete search history.

(56) References Cited

U.S. PATENT DOCUMENTS 2,417,828 A 3/1947 Joy
2,684,262 A 7/1954 Neesen
(Continued)

FOREIGN PATENT DOCUMENTS

CN 101501375 A 8/2009
EP 0152938 A2 8/1985
(Continued)

OTHER PUBLICATIONS

Communication pursuant to Article 94(3) EPC for European Patent Application No. 17812299.0, dated Apr. 11, 2019.
(Continued)

*Primary Examiner* — Nicholas L Foster
(74) *Attorney, Agent, or Firm* — Merchant & Gould P.C.

(57) ABSTRACT

To fulfill a sealing function for a fluid within a short period of time when a pump configured to pressure-feed the fluid is activated, provided are a seal ring, including: a first side surface (20); a second side surface (30) being a side surface on a side opposite to the first side surface (20); and a first side-surface side projecting portion (40) formed on the first side surface (20), in which a distal end portion (42) of the first side-surface side projecting portion (40) projects most toward an outward side from the first side surface (20) as compared to an entire surface of the first side surface (20) except for the distal end portion (42), and a sealing device using the same.

10 Claims, 19 Drawing Sheets

(51) Int. Cl.
*F16J 15/44* (2006.01)
*F16J 15/48* (2006.01)
*F16J 15/32* (2016.01)
*F16J 15/16* (2006.01)

(52) U.S. Cl.
CPC ............. *F16J 15/48* (2013.01); *F16J 15/164* (2013.01); *F16J 15/32* (2013.01)

(56) References Cited

U.S. PATENT DOCUMENTS

| | | | | |
|---|---|---|---|---|
| 5,002,290 | A * | 3/1991 | Pernin | F16J 15/024 277/649 |
| 6,722,660 | B2 * | 4/2004 | Gernand | F16J 15/061 277/591 |
| 7,341,256 | B2 * | 3/2008 | Nakaoka | F16J 15/441 277/496 |
| 7,966,813 | B2 * | 6/2011 | Struschka | B60T 11/228 60/588 |
| 8,141,881 | B2 * | 3/2012 | Keck | F16J 15/164 277/438 |
| 10,309,539 | B2 * | 6/2019 | Kakehi | F16J 15/18 |
| 10,451,185 | B2 * | 10/2019 | Yamaguchi | F16J 15/441 |
| 2004/0173976 | A1 * | 9/2004 | Boggs | F16J 15/164 277/628 |
| 2006/0038355 | A1 | 2/2006 | Nakaoka et al. | |
| 2006/0055120 | A1 * | 3/2006 | Umetsu | F16J 9/14 277/459 |
| 2008/0053305 | A1 * | 3/2008 | Struschka | B60T 11/228 92/24 |
| 2011/0140368 | A1 * | 6/2011 | Keck | F16J 15/164 277/500 |
| 2018/0231127 | A1 * | 8/2018 | Kakehi | F16J 15/18 |
| 2019/0040956 | A1 * | 2/2019 | Yamaguchi | F16J 15/3272 |

FOREIGN PATENT DOCUMENTS

| | | |
|---|---|---|
| JP | 04-1409 Y2 | 1/1992 |
| JP | 4736394 B | 7/2011 |
| JP | 5049993 B | 10/2012 |
| JP | 2012-247048 A | 12/2012 |
| WO | 2012/165083 A1 | 12/2012 |

OTHER PUBLICATIONS

Search Report for European Patent Application No. 17812299.0, dated Jun. 7, 2018.
Office Action for Chinese Patent Application No. 201780002081.0, dated Feb. 25, 2020.

* cited by examiner

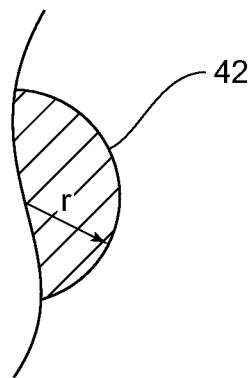
FIG. 7A
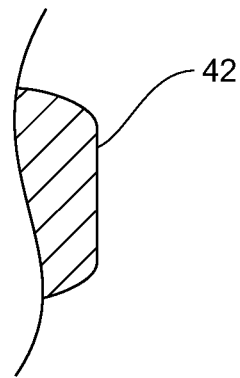
FIG. 7B
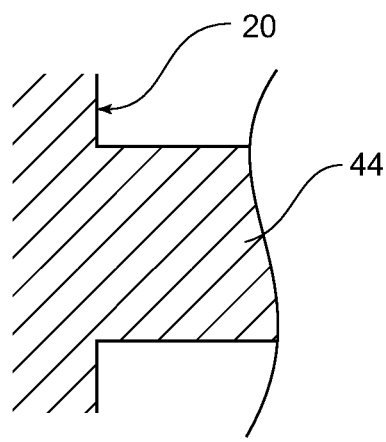
FIG. 7C
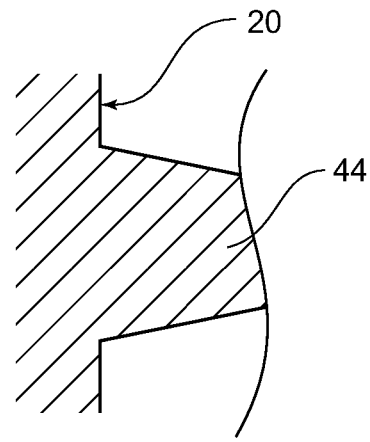
FIG. 7D
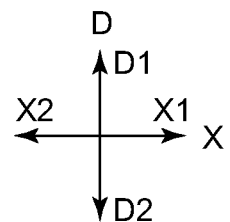

SEAL RING AND SEALING DEVICE

This application is a National Stage of International Patent Application No. PCT/JP2017/010032, filed Mar. 13, 2017, which application is incorporated herein by reference. To the extent appropriate, a claim of priority is made to above disclosed application.

TECHNICAL FIELD

The present invention relates to a seal ring and a sealing device.

BACKGROUND

A seal ring is mounted in an annular groove formed in a peripheral surface of one of two members (shaft member and housing) which rotate relative to each other. The seal ring is brought into close contact with a side wall surface of the annular groove and a peripheral surface of another of the two members so as to be freely slidable, to thereby seal an annular gap formed between the two members. The seal ring is used for apparatus using a fluid pressure of hydraulic working oil (hereinafter abbreviated as "working oil") or the like, which include an automatic transmission (hereinafter referred to as "AT") and a continuously variable transmission (hereinafter referred to as "CVT") for an automobile.

Various seal rings have been proposed as the above-mentioned seal ring. For example, in Patent Literature 1, there is proposed a seal ring having features (1) to (5) described below for the purpose of reducing a sliding resistance and improving ease of assembly.

(1) The seal ring includes a first sealing portion configured to seal a side wall surface of an annular groove, which is formed in one of two members, on a side not closer to a fluid to be sealed (low-pressure side).

(2) The seal ring includes a second sealing portion configured to seal a surface of another of the two members.

(3) The seal ring has a structure in which an axial width of a ring main body on a side closer to a groove bottom of the annular groove than to the first sealing portion is set smaller than an axial width of the ring main body at the first sealing portion.

(4) The seal ring has a structure in which projecting portions projecting toward side wall surfaces of the annular groove are formed over an entire periphery on the side closer to the groove bottom than to the first sealing portion.

(5) The projecting portions are formed so as not to come into contact with the side wall surfaces of the annular groove even when a fluid to be sealed acts in an annular gap formed between the two members.

Further, in Patent Literature 2, there is proposed a seal ring having features (1) to (4) described below for the purpose of achieving reduction in heat generation amount and achieving reduction in contact pressure.

(1) Side surfaces of the seal ring, which are opposed to side wall surfaces of an annular groove, are formed of level-difference surfaces which are recessed on a side closer to a groove bottom of the annular groove so as to be apart from the side wall surfaces.

(2) A plurality of projections which project toward the side wall surfaces are independently formed on the recessed surfaces.

(3) One of side surfaces of the seal ring, which is closer to another member, is brought into close contact with the side wall surface of the annular groove so as to be freely slidable, thereby forming a seal.

(4) Distal end surfaces of the plurality of projections are brought into close contact with the side wall surface of the annular groove so as to be freely slidable.

CITATION LIST

Patent Literature

[PTL 1] JP 4736394
[PTL 2] WO 2012/165083 pamphlet

SUMMARY OF INVENTION

Technical Problem

Meanwhile, in a transmission such as the AT or the CVT, which includes the related-art seal ring exemplified in Patent Literature 1, Patent Literature 2, and the like and performs shift control with the working oil pressure-fed by a hydraulic pump, a sealing function of the seal ring for the working oil becomes insufficient under a zero differential-pressure state in which a hydraulic pressure difference of the working oil is zero, for example, after elapse of a long period of time from stop of the hydraulic pump, or under a low differential-pressure state in which there is little hydraulic pressure difference of the working oil, for example, after elapse of a short period of time from the stop of the hydraulic pump. In this case, the working oil undesirably flows out into an oil tank. In a case where the hydraulic pressure difference is brought into the zero differential-pressure state or the low differential-pressure state as a result of the stop of the hydraulic pump, and then an engine is started (specifically, the hydraulic pump is activated) under a state in which no or little working oil is present in a periphery of the seal ring, however, the sealing function recovers along with elapse of time.

Hitherto, time required for the recovery of the sealing function for the working oil at the engine start as described above is not regarded as a problem. In recent years, however, in order to achieve fuel saving and exhaust gas reduction for automobiles, a technology of automatically stopping the engine (so-called "idling stop") when the automobile is temporarily stopped, for example, at a red traffic light is increasingly adopted. When the automobile that adopts the technology described above runs in an urban area with a particularly large number of traffic lights, engine stop and restart are frequently repeated. Therefore, along with the repeated engine stop and restart, the sealing function is also repeatedly decreased and recovered. Meanwhile, immediately after the engine restart, a gear shift is immediately performed by the transmission in many cases. Therefore, in such a case, it is important to enable quick fulfillment of the sealing function immediately after the engine restart.

The present invention has been made in view of the circumstances described above, and has an object to provide a seal ring that enables fulfillment of a sealing function for a fluid within a short period of time when a pump configured to pressure-feed the fluid is activated and a sealing device using the same.

Solution to Problem

The above-mentioned object is achieved by embodiments of the present invention to be described below. That is, according to one embodiment of the present invention, there is provided a seal ring, including: a first side surface; a second side surface being a side surface on a side opposite to the first side surface; and a first side-surface side projecting portion formed on the first side surface, in which a distal end portion of the first side-surface side projecting portion projects most toward an outward side from the first side surface as compared to an entire surface of the first side surface except for the distal end portion.

In one embodiment of the seal ring of the present invention, it is preferred that the first side-surface side projecting portion includes three or more first side-surface side projection portions which are formed discretely in a circumferential direction of the seal ring.

In another embodiment of the seal ring of the present invention, it is preferred that a sectional shape of a cross section of the distal end portion of the first side-surface side projecting portion, which is orthogonal to the circumferential direction, be any shape selected from an arc shape and a flat surface shape.

In another embodiment of the seal ring of the present invention, it is preferred that a sectional shape of a cross section of the seal ring, which is orthogonal to the circumferential direction, be asymmetric with respect to a radial center line that divides the sectional shape into two sides corresponding to one side and another side of a center axis of the seal ring.

In another embodiment of the seal ring of the present invention, it is preferred that only the first side-surface side projecting portion be formed on the first side surface as a projecting portion to be formed on the first side surface and the second side surface.

In another embodiment of the seal ring of the present invention, it is preferred that a width of an inner peripheral surface of the seal ring in a direction parallel to the center axis be smaller than a width of an outer peripheral surface of the seal ring.

In another embodiment of the seal ring of the present invention, it is preferred that a height H0 of the first side-surface side projecting portion be equal to or smaller than 0.5 mm.

In another embodiment of the seal ring of the present invention, it is preferred that, in a case where it is assumed that the first side-surface side projecting portion is prevented from being formed on the first side surface, when a height of a plane which includes a region of the first side surface, the region being first contactable with an imaginary plane orthogonal to the center axis after the imaginary plane is relatively moved closer to the first side surface from the outward side of the first side surface, and is parallel to a radial direction of the seal ring, is defined as 0 mm, a projection height H1 of the first side-surface side projecting portion with respect to the plane be larger than 0 mm and equal to or smaller than 0.5 mm.

In another embodiment of the seal ring of the present invention, it is preferred that the seal ring further include a first portion and a second portion which have different sectional shapes of cross sections orthogonal to the circumferential direction except for the first side-surface side projecting portion, that the first portion and the second portion be arranged alternately in the circumferential direction, and that an inner peripheral surface of the second portion be formed on an outer periphery side with respect to an inner peripheral surface of the first portion.

According to one embodiment of the present invention, there is provided a sealing device, including: a housing having a shaft hole; a shaft member, which is arranged in the shaft hole and is configured to rotate relative to the housing; and a seal ring, which is mounted in an annular groove formed in an outer peripheral surface of the shaft member and is configured to seal an annular gap formed between the shaft member and the housing, in which, when a fluid is pressure-fed into the annular groove, one side of a center axis of the shaft member becomes a high-pressure side and another side of the center axis of the shaft member becomes a low-pressure side, in which the seal ring includes a high-pressure side projecting portion formed on a side surface of the seal ring on the high-pressure side, and in which a distal end portion of the high-pressure side projecting portion projects most toward the high-pressure side as compared to an entire side surface on the high-pressure side except for the distal end portion.

In one embodiment of the sealing device of the present invention, it is preferred that the high-pressure side projecting portion include three or more high-pressure side projection portions which are formed discretely in a circumferential direction of the seal ring.

In another embodiment of the sealing device of the present invention, it is preferred that a sectional shape of a cross section of the distal end portion of the high-pressure side projecting portion, which is orthogonal to the circumferential direction of the seal ring, be any shape selected from an arc shape and a flat surface shape.

In another embodiment of the sealing device of the present invention, it is preferred that a sectional shape of a cross section of the seal ring, which is orthogonal to the circumferential direction of the seal ring, be asymmetric with respect to a radial center line that divides the sectional shape into two sides corresponding to one side and another side of a center axis of the seal ring.

In another embodiment of the sealing device of the present invention, it is preferred that only the high-pressure side projecting portion be formed only on the side surface on the high-pressure side as a projecting portion to be formed on a side surface on the low-pressure side and the side surface on the high-pressure side of the seal ring.

In another embodiment of the sealing device of the present invention, it is preferred that a width of an inner peripheral surface of the seal ring in a direction parallel to the center axis of the seal ring be smaller than a width of an outer peripheral surface of the seal ring.

In another embodiment of the sealing device of the present invention, it is preferred that a height H0 of the high-pressure side projecting portion be equal to or smaller than 0.5 mm.

In another embodiment of the sealing device of the present invention, it is preferred that, in a case where it is assumed that the high-pressure side projecting portion is prevented from being formed on the side surface of the seal ring on the high-pressure side, when a height of a plane which includes a region of the side surface of the seal ring on the high-pressure side, the region being first contactable with a side wall surface of the annular groove on the high-pressure side, and is parallel to a radial direction of the seal ring, is defined as 0 mm, a projection height H1 of the high-pressure side projecting portion with respect to the plane be larger than 0 mm and equal to or smaller than 0.5 mm.

In another embodiment of the sealing device of the present invention, it is preferred that the seal ring further include a first portion and a second portion which have different sectional shapes of cross sections orthogonal to the circumferential direction of the seal ring except for the high-pressure side projecting portion, that the first portion and the second portion be arranged alternately in the circumferential direction of the seal ring, and that an inner peripheral surface of the second portion be formed on an outer periphery side in a radial direction of the seal ring with respect to an inner peripheral surface of the first portion.

In another embodiment of the sealing device of the present invention, it is preferred that an inner peripheral surface profile line of the inner peripheral surface of the seal ring on a cross section orthogonal to the circumferential direction of the seal ring have an arc shape having a center point of an arc being present on an outer periphery side of the seal ring in the radial direction with respect to the inner peripheral surface profile line, that a bottom wall surface profile line of a bottom wall surface of the annular groove on a cross section orthogonal to a circumferential direction of the shaft member have an arc shape having a center point of an arc being present on an outer periphery side of the shaft member in the radial direction with respect to the bottom wall surface profile line, and that Expression (1) of Rg≥Rs be satisfied, where Rg is a curvature radius of the groove bottom wall surface profile line of the annular groove, and Rs is a curvature radius of the inner peripheral surface profile line of the seal ring.

Advantageous Effects of Invention

According to the present invention, the seal ring that enables fulfillment of a sealing function for a fluid within a short period of time when the pump configured to pressure-feed the fluid is activated, and the sealing device using the same can be provided.

BRIEF DESCRIPTION OF DRAWINGS

FIG. 7 are schematic sectional views for illustrating examples of a sectional shape of a first side-surface side projecting portion, in which FIG. 7(A) is a sectional view for illustrating an example of a sectional shape of a distal end portion of the first side-surface side projecting portion, FIG. 7(B) is a sectional view for illustrating another example of the sectional shape of the distal end portion of the first side-surface side projecting portion, FIG. 7(C) is a sectional view for illustrating an example of a sectional shape of a main body portion of the first side-surface side projecting portion, and FIG. 7(D) is a sectional view for illustrating another example of the sectional shape of the main body portion of the first side-surface side projecting portion.

FIG. 13 are schematic sectional view for illustrating modification examples of a sectional structure taken along the line XII-XII in FIG. 11, in which

FIG. 17 are schematic sectional views of a test device used for evaluation of the seal ring, in which

DESCRIPTION OF EMBODIMENTS

Figure 1:
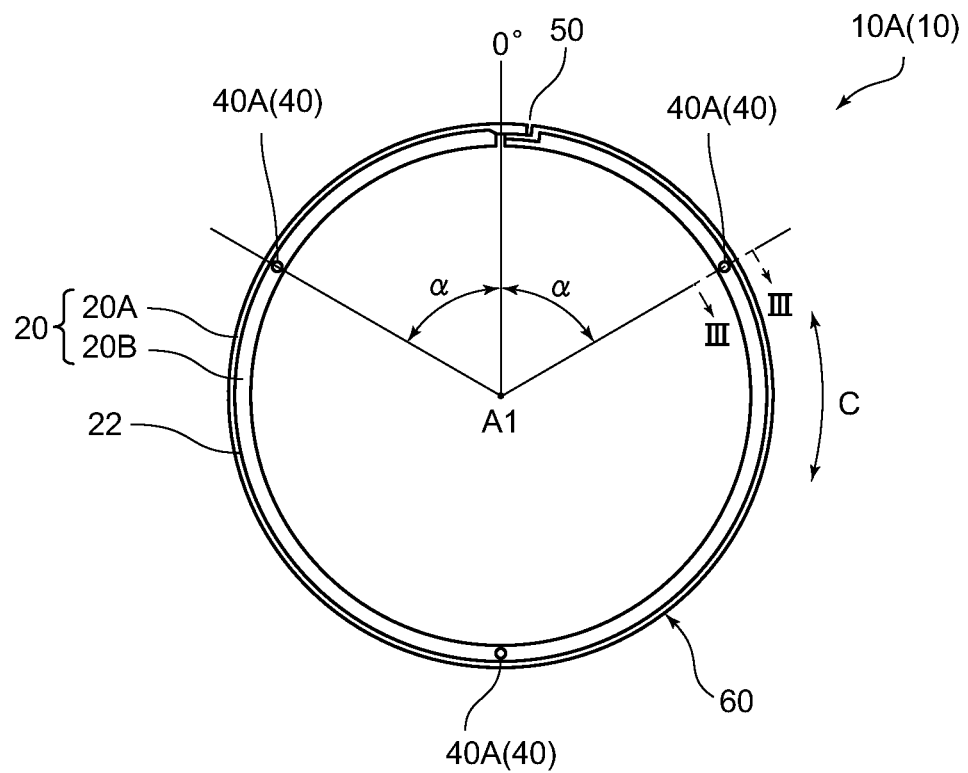
FIG. 1 is a schematic plan view for illustrating an example of a seal ring according to this embodiment.
Figure 2:
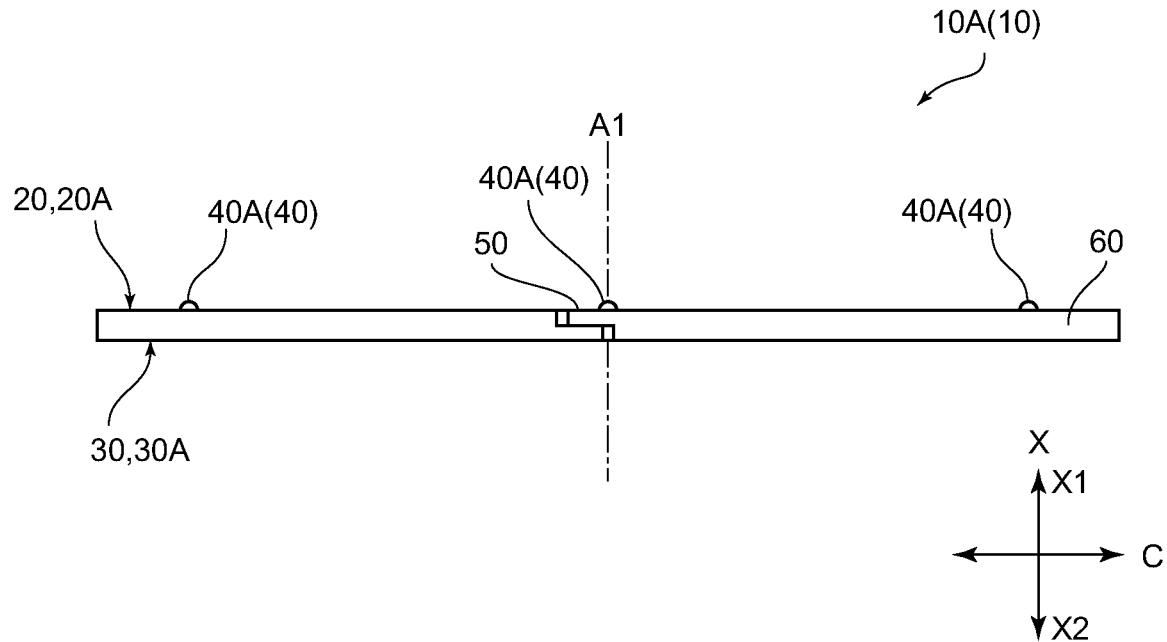
FIG. 2 is a view of the seal ring illustrated in FIG. 1, as viewed from an outer peripheral surface side (0° direction side in FIG. 1) of the seal ring.
Figure 3:
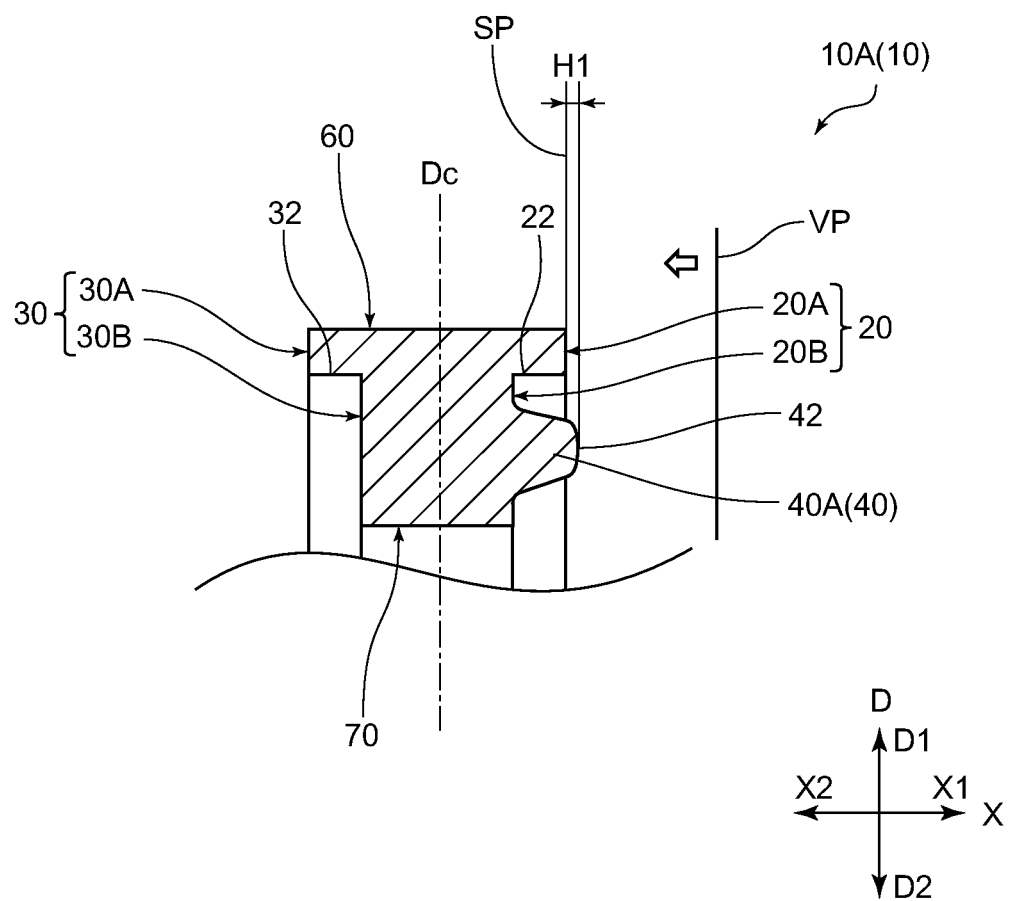
FIG. 3 is a schematic sectional view taken along the line III-III in FIG. 1.

FIG. 1 to FIG. 3 are schematic views for illustrating an example of a seal ring according to this embodiment. FIG. 1 is a plan view of the seal ring as viewed from one side of a center axis thereof, specifically, is a plan view of a first side surface. FIG. 2 is a view of the seal ring illustrated in FIG. 1 as viewed from an outer peripheral surface side (0° direction side in FIG. 1) of the seal ring. Further, FIG. 3 is a sectional view taken along the line in FIG. 1, specifically, a view for illustrating a sectional shape obtained when the seal ring illustrated in FIG. 1 is cut along a plane orthogonal to a circumferential direction.

In FIG. 1 to FIG. 3, and in the drawings subsequent to FIG. 4, which are referred to later and include illustration of the seal ring alone, the reference symbol A1 in the drawings denotes the center axis of the seal ring. The reference symbol X denotes a direction parallel to the center axis A1 of the seal ring and a width direction of the seal ring. The reference symbol C denotes a circumferential direction of the seal ring. The reference symbol D denotes a radial direction of the seal ring. Further, the reference symbol X1 denotes a first side surface side of the seal ring, and the reference symbol X2 denotes a second side surface side of the seal ring. The reference symbol D1 denotes an outer periphery side of the seal ring, and the reference symbol D2 denotes an inner periphery side of the seal ring.

Further, in the drawings subsequent to FIG. 4, which are referred to later and include illustration of a sealing device, the reference symbol X denotes a direction parallel to the center axis A1 of the seal ring (in an upright state), the width direction of the seal ring, a center axis of a shaft member, and a center axis of a shaft hole of a housing. The reference symbol D denotes a direction parallel to the radial direction of the seal ring (in the upright state), a radial direction of the shaft member, and a radial direction of the shaft hole of the housing. Further, the reference symbol X1 denotes the first side surface side of the seal ring and a high-pressure side, which is defined when a pressure difference of a fluid is generated between one end side and another end side of an annular gap in the X-direction. The reference symbol X2 denotes the second side surface side of the seal ring and a low-pressure side, which is defined when the pressure difference of the fluid is generated between the one end side and the another end side of the annular gap in the X-direction. Still further, the reference symbol D1 denotes an outer periphery side of the seal ring, the shaft member, and the shaft hole of the housing in a radial direction, and the reference symbol D2 denotes an inner periphery side of the seal ring, the shaft member, and the shaft hole of the housing in the radial direction.

A seal ring 10A (10) includes a first side surface 20, a second side surface 30 being a side surface on a side opposite to the first side surface 20, and first side-surface side projecting portions 40A (40) formed on the first side surface 20.

A joint portion 50 is provided to a portion of the seal ring 10A in a circumferential direction C. A shape of the joint portion 50 is not particularly limited, and may be suitably selected from publicly-known shapes including a butt (straight) joint type, an angle joint type, and a lap (step) joint type. In order to interrupt an flow of a fluid (such as working oil) into a gap portion in the joint portion 50 so as to improve sealability, it is preferred that a composite step cut type be selected. In an example illustrated in FIG. 1 and FIG. 2, the composite step cut type is adopted as the shape of the joint portion 50. Although it is generally preferred that the joint portion 50 be provided to the seal ring 10A in terms of workability in mounting, the joint portion 50 may be omitted as needed.

In the example illustrated in FIG. 1 and FIG. 2, the three first side-surface side projecting portions 40A are formed discretely (discontinuously) along the circumferential direction C. As illustrated in FIG. 2, the joint portion 50 (boundary that forms a gap portion between both end portions of the seal ring 10A in the circumferential direction C) as viewed from an outer peripheral surface 60 side of the seal ring 10A has a level-difference shape extending from the second side surface 30 side in the X1-direction to a central portion of the seal ring 10A in the width direction, then extending along the circumferential direction C, and extending in the X1-direction toward the first side surface 20 again. Here, a direction that connects the boundary extending from the second side surface 30 side in the X1-direction to the central portion of the seal ring 10A in the width direction and the center axis A1 of the seal ring 10A and is orthogonal to these two straight lines is defined as 0°. In this case, two first side-surface side projecting portions 40 are formed at α=60° positions, and one first side-surface side projecting portion 40 is formed at a 180° position. The angle α may be suitably selected within a range of, for example, from 30° to 90°.

Further, in the seal ring 10A illustrated in FIG. 1 to FIG. 3, the first side surface 20 has a level-difference portion 22 and the second side surface 30 has a level-difference portion 32. The level-difference portions 22 and 32 are continuous in the circumferential direction C. Each of the first side surface 20 and the second side surface 30 is divided into two regions. Specifically, the first side surface 20 is divided into a first region 20A on the outer peripheral surface 60 side of the seal ring 10A and a second region 20B on an inner peripheral surface 70 side of the seal ring 10A at the level-difference portion 22 as a boundary, and the second side surface 30 is divided into a first region 30A on the outer peripheral surface 60 side and a second region 30B on the inner peripheral surface 70 side at the level-difference portion 32 as a boundary. The first regions 20A and 30A and the second regions 20B and 30B are all flat surfaces that are parallel to a plane orthogonal to the center axis A1 (X-direction). The second regions 20B and 30B are formed so as to be recessed inward from the first regions 20A and 30A with respect to the center axis A1. In the seal ring 10A illustrated in FIG. 3, level-difference surfaces respectively forming the level-difference portions 22 and 32 are surfaces parallel to the X-direction. However, the level-difference surfaces may also be tapered surfaces that intersect with the X-direction.

In the seal ring 10A illustrated in FIG. 1 to FIG. 3, the first side-surface side projecting portions 40A are formed in the second region 20B of the first side surface 20. Distal end portions 42 thereof project toward an outward side with respect to the first region 20A (toward the X1-direction side from the first region 20A as a reference). Specifically, as exemplified in FIG. 1 to FIG. 3, in the seal ring 10 of this embodiment, the distal end portions 42 of the first side-surface side projecting portions 40A project most toward an outward side from the first side surface 20 as compared to an entire surface of the first side surface 20 except for the distal end portions 42. In the description of the present application, a direction of approaching the seal ring in the X-direction corresponds to "inward", and a direction of separating from the seal ring in the X-direction corresponds to "outward", unless otherwise noted.

In the description of the present application, the "projecting portion" which can be formed on the first side surface 20 and the second side surface 30 of the seal ring 10 corresponds to any one of (1) a projecting portion which is formed so as to project toward the outward side from the seal ring 10 and has a flat surface (base surface) formed on an inward side of the seal ring 10 with respect to the distal end portion of the projecting portion on both sides at a bottom of the projecting portion in a radial direction D, and (2) a projecting portion which is formed so as to project toward the outward side from the seal ring 10 and has a flat surface (base surface) formed on the inward side of the seal ring 10 with respect to the distal end portion of the projecting portion only in an outer peripheral side portion at the bottom of the projecting portion in the radial direction D.

For example, in the first side-surface side projecting portions 40A illustrated in FIG. 3, and in FIG. 8 and FIG. 14 which are referred to later, both side portions of each of the first side-surface side projecting portions 40A in the radial direction D are surrounded by the base surface (second region 20B). In a second side-surface side projecting portion 46 illustrated in FIG. 8 which is referred to later, both side portions of the second side-surface side projecting portion 46 in the radial direction D are surrounded by the base surface (second region 30B). In a first side-surface side projecting portion 40B illustrated in FIG. 9 which is referred to later, both side portions of the first side-surface side projecting portion 40B in the radial direction D are surrounded by the base surface (first side surface 20). In a first side-surface side projecting portion 40C illustrated in FIG. 10 which is referred to later, both side portions of the first side-surface side projecting portion 40C in the radial direction D are surrounded by the base surface (second region 20B). Further, all the first side-surface side projecting portions 40 and the second side-surface side projecting portion 46 illustrated in the drawings described above are formed so as to project toward the outward side from the seal ring 10. Meanwhile, for example, as exemplified in FIG. 3, the first regions 20A and 30A that form the side surface portions (second regions 20B and 30B), which each have only the inner peripheral side portion recessed in the radial direction D, do not correspond to the "projecting portion" in the description of the present application.

Further, a projection height H1 of each of the first side-surface side projecting portions 40 corresponds to a height (height from a reference plane SP to a top of the distal end portion 42) in a direction (X-direction) parallel to the center axis A1 when a height of the reference plane SP described later is defined as 0 mm. For determination of the reference plane SP, it is first assumed that the first side-surface side projecting portions 40 are not formed on the first side surface 20. In this case, a plane including a region of the first side surface, which is first contactable with an imaginary plane VP orthogonal to the center axis A1 (direction parallel to the X-direction in FIG. 3) when the imaginary plane VP is moved closer relative to the first side surface 20 from an outward side of the first side surface 20, and being parallel to the radial direction D is set as a reference plane having a height of 0 mm. For example, in the example illustrated in FIG. 3, the reference plane SP is a plane flush with the first region 20A.

As exemplified in FIG. 3, in the seal ring 10 of this embodiment, the distal end portion 42 of the first side-surface side projecting portion 40A projects most toward an outward side from the first side surface 20 as compared to the entire surface of the first side surface 20 except for the distal end portion 42. Therefore, in a sealing device using the seal ring 10 of this embodiment, when a pump configured to pressure-feed a fluid is activated, a sealing function for the fluid can be fulfilled within a short period of time. The reason why the effect described above can be obtained is described below.

First, when the seal ring is mounted in an annular groove formed in a peripheral surface of one of two members (shaft member and housing) which are main members constructing the sealing device and rotate relative to each other, the seal ring is in an upright state inside the annular groove under a high differential-pressure state in which a pressure difference of the fluid inside the annular groove is sufficiently high, that is, a case where the sealing function is perfectly fulfilled. When the pressure difference of the fluid inside the annular groove is in a zero differential-pressure state or a low differential-pressure state, that is, a case where the sealing function is substantially lost, the seal ring is in a state of being inclined to a large or small extent inside the annular groove. Therefore, when the seal ring is significantly inclined when the pump is activated, a state of the seal ring is changed from the inclined state to the upright state. At the same time, a longer period of time is required to fulfill the sealing function. This point is described more in detail below with reference to the drawings.

Figure 18:
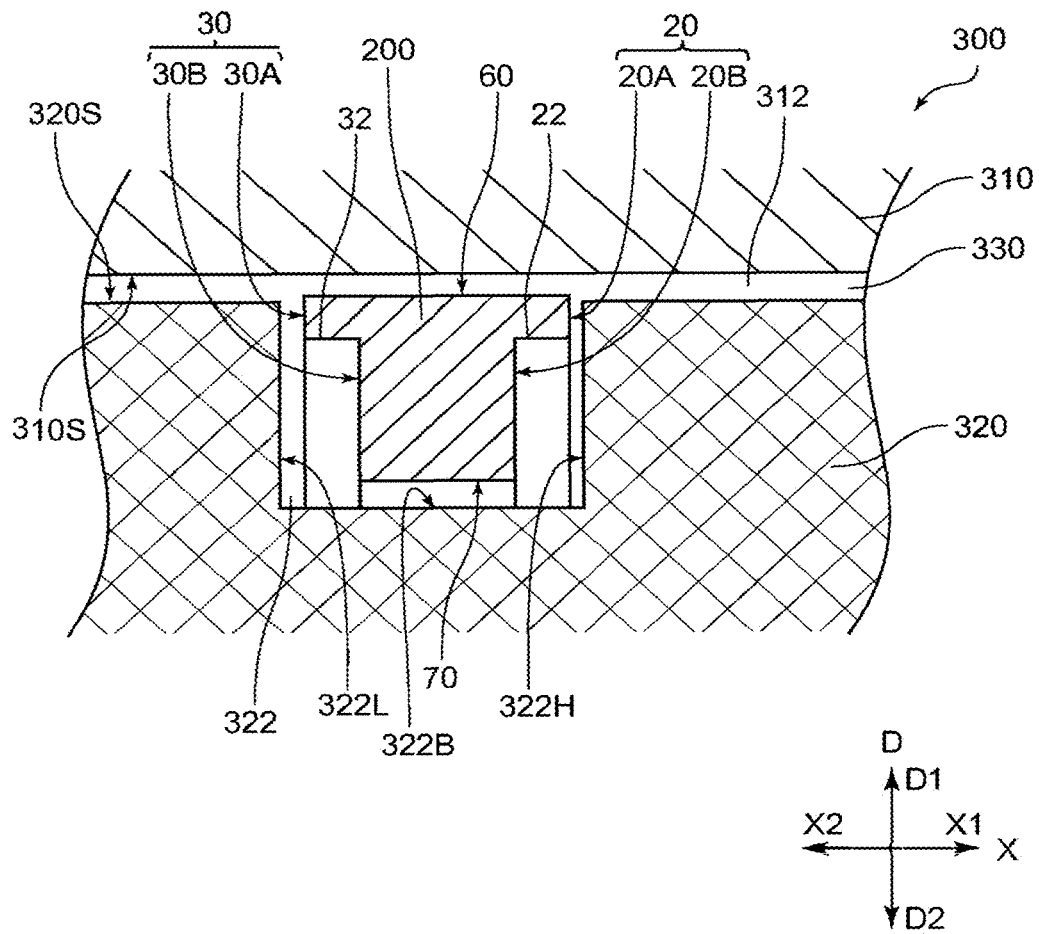
FIG. 18 is a schematic view for illustrating an example of a related-art sealing device (under the pump stopped state in which the sealing function is substantially lost).
Figure 19:
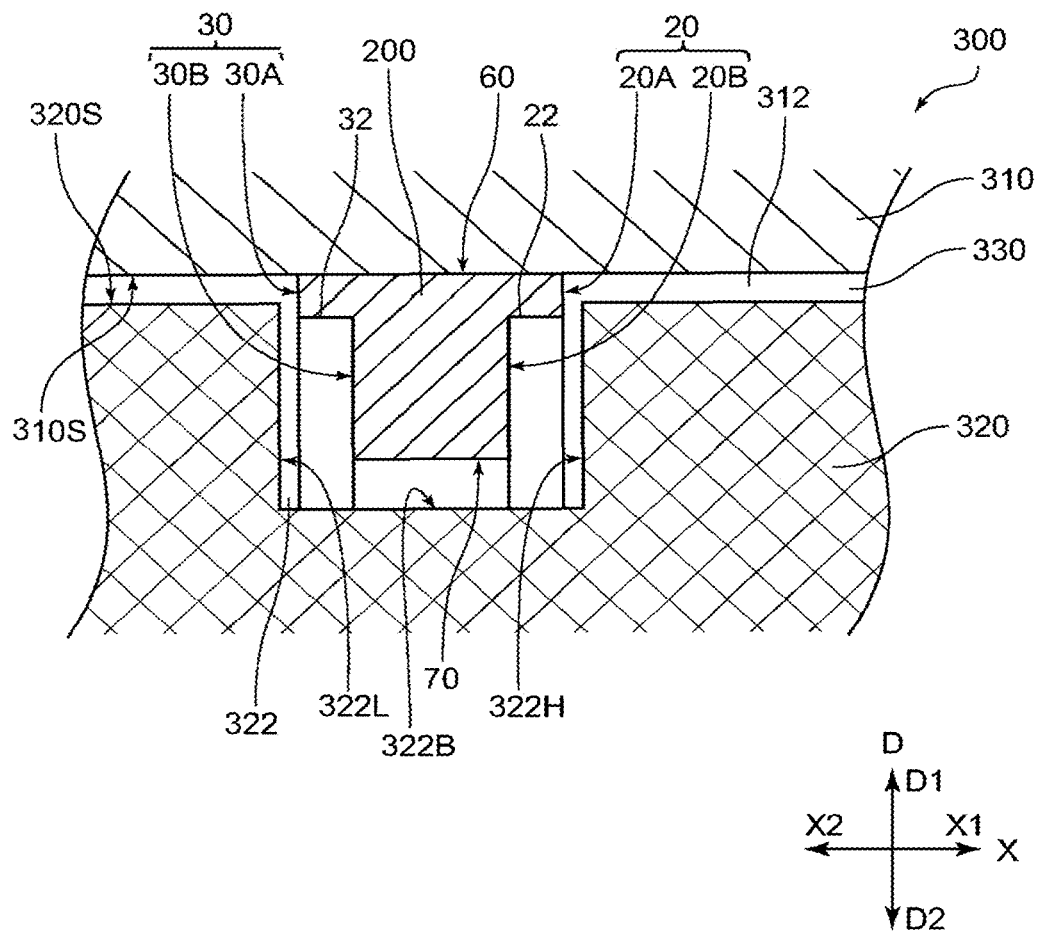
FIG. 19 is a schematic view for illustrating an example of the related-art sealing device (under a state immediately after activation of the pump in which the sealing function is being recovered).
Figure 20:
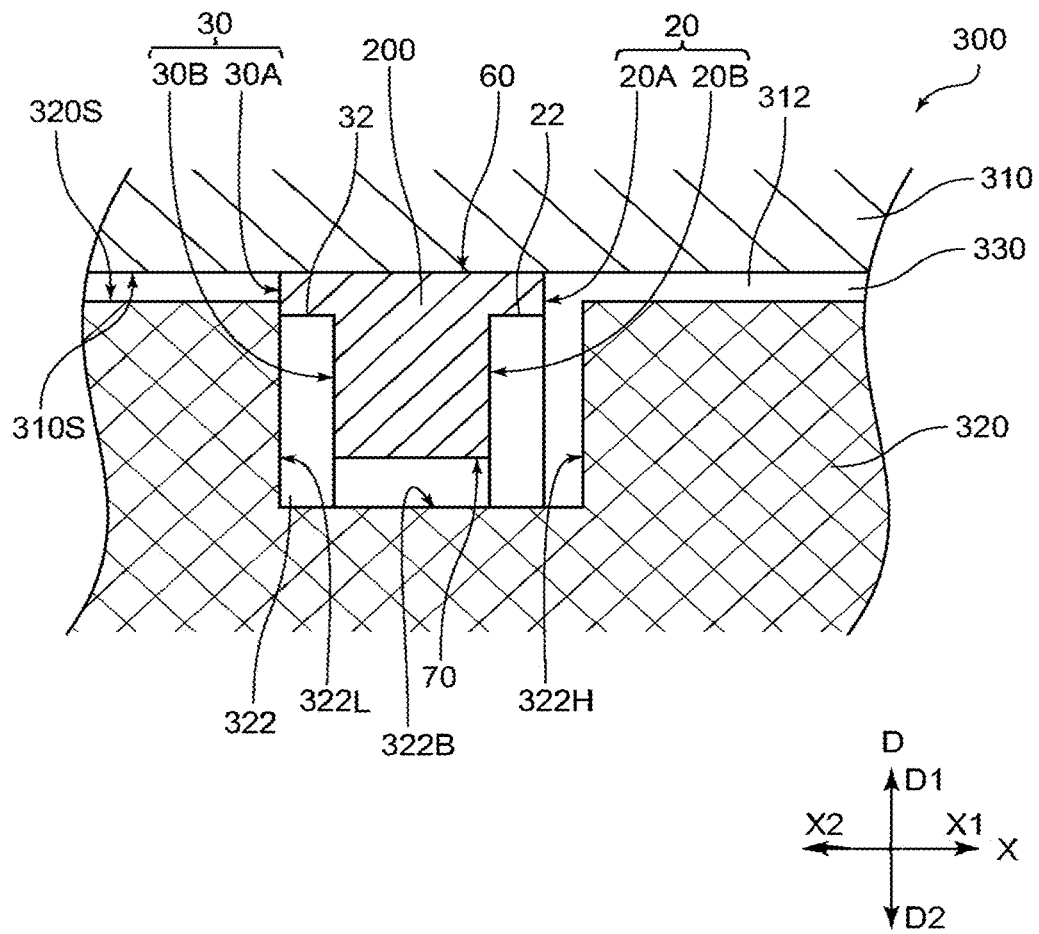
FIG. 20 is a schematic view for illustrating an example of the related-art sealing device (under a state in which the pressure difference of the fluid in the annular groove is brought into the high differential-pressure state so that the sealing function is perfectly fulfilled).

FIG. 18 to FIG. 20 are schematic sectional views for illustrating an example of a sealing device using a related-art seal ring. FIG. 18 is a view for illustrating a case where the pressure difference of the fluid in the annular gap is in the zero differential-pressure state or the low differential-pressure state, that is, a case where the sealing function is substantially lost under a state in which the pump is stopped. FIG. 19 is a view for illustrating a case immediately after activation of the pump, that is, a case where the sealing function is being recovered. FIG. 20 is a view for illustrating a case where the pressure difference of the fluid in the annular gap is in the high differential-pressure state, that is, a case where the sealing function is perfectly fulfilled.

A sealing device 300 illustrated in FIG. 18 to FIG. 20 includes a housing 310, a shaft member 320, and a seal ring 200. The housing 310 has a shaft hole 312. The shaft member 320 is arranged in the shaft hole 312 and is configured to rotate relative to the housing 310. The seal ring 200 is mounted in an annular groove 322. The annular groove 322 has a rectangular sectional shape and is formed in an outer peripheral surface 320S of the shaft member 320. The seal ring 200 is a member having the same dimensions and shape (T-like sectional shape) as those of the seal ring 10A illustrated in FIG. 1 to FIG. 3 except that the first side-surface side projecting portions 40A are not formed on the first side surface 20. Further, side wall surfaces 322H and 322L of the annular groove 322 are flat surfaces which are parallel to a plane orthogonal to a center axis (X-direction) of the shaft member 320. Further, an annular gap 330 is formed between an inner peripheral surface 310S of the housing 310 and the outer peripheral surface 320S of the shaft member 320. The annular gap 330 is in communication with a space in the annular groove 322. One side (X1-direction side) of the annular gap 330 in the center axis of the shaft member 320 is connected to a pump configured to pressure-feed the fluid such as working oil (not shown). When the pump is activated, the fluid such as the working oil is pressure-fed from an end of the annular gap 330 on the X1-direction side into the annular groove 322.

Under a state in which the pump is stopped over a long period of time or a short period of time as illustrated in FIG. 18, a pressure difference between the X1-direction side and an X2-direction side of the annular gap 330 is zero or extremely small. Therefore, a pressure of the fluid does not substantially act even on the inner peripheral surface 70 side of the seal ring 200, and hence the seal ring 200 may be brought into a state of being separated from the side wall surface 322H of the annular groove 322 on the X1-direction side, the side wall surface 322L on the X2-direction side, and the inner peripheral surface 310S of the housing 310. In this state, the seal ring 200 cannot fulfill the sealing function. Thus, at this stage, the transmission using the sealing device 300 cannot perform even shift control.

Under the state immediately after the activation of the pump as illustrated in FIG. 19, the fluid supplied from the X1-direction side of the annular gap 330 first flows into the annular groove 322. Therefore, the pressure of the fluid acts on the inner peripheral surface 70 of the seal ring 200 to increase a diameter of the seal ring 200. As a result, the outer peripheral surface 60 starts coming into close contact with the inner peripheral surface 310S of the housing 310. At the same time, the pressure of the fluid acts even on the first region 20A and the second region 20B of the first side surface 20 of the seal ring 200 to move the seal ring 200 toward the X2-direction side of the annular gap 330. As a result, a gap between the first region 30A of the second side surface 30 of the seal ring 200 and the side wall surface 322L of the annular groove 322 on the X2-direction side is reduced. Thus, the pressure difference between the X1-direction side and the X2-direction side of the annular gap 330 is generated and starts increasing.

Finally, under a state after elapse of a certain period of time from the activation of the pump as illustrated in FIG. 20, the outer peripheral surface 60 of the seal ring 200 comes into close contact with the inner peripheral surface 310S of the housing 310 over an entire periphery, and the second side surface 30 (the first regions 30A thereof) comes into close contact with the side wall surface 322L over an entire surface, thereby fulfilling the sealing function. Therefore, at this stage, the transmission using the sealing device 300 can perform reliable shift control. Further, at this stage, the seal ring 200 is maintained in a completely upright posture inside the annular groove 322.

In FIG. 18, the seal ring 200 is illustrated as being in an upright state. In practice, however, inclination to a large or small extent with respect to the radial direction D is inevitable. This is because the pressure of the fluid does not substantially act on any of the first side surface 20, the second side surface 30, the outer peripheral surface 60, and the inner peripheral surface 70 of the seal ring 200, specifically, an external force for forcibly causing the seal ring 200 to maintain a given constant posture is not applied to the seal ring 200.

Therefore, in order to change the state illustrated in FIG. 18, in which the sealing function is not fulfilled, to the state illustrated in FIG. 20, in which the sealing function is perfectly fulfilled by activating the pump, it is necessary to move the seal ring 200 toward the side wall surface 322L of the annular groove 322 and the inner peripheral surface 310S of the housing 310 while bringing the posture of the inclined seal ring 200 into the upright state. Thus, when the inclination of the seal ring 200 before the activation of the pump is large, time required from the activation of the pump to sufficient fulfillment of the sealing function becomes inevitably longer.

Meanwhile, the seal ring 10 of this embodiment includes the first side-surface side projecting portions 40 formed on the first side surface 20. Therefore, under a state before the activation of the pump, a range of free movement inside the annular groove 322 is significantly limited in the seal ring 10 of this embodiment as compared to the related-art seal ring having the same dimensions and shape as those of the seal ring 10 of this embodiment except for the absence of the first side-surface side projecting portions 40. Therefore, under the state before the activation of the pump, the significant inclination of the seal ring 10 can be drastically suppressed. After the activation of the pump, a travel distance inside the annular groove 322, which is required for the seal ring 10 to fulfill the sealing function, can be further reduced. Thus, the time required from the activation of the pump to sufficient fulfillment of the sealing function can be reduced.

In addition, a portion of the first side surface 20, on which the first side-surface side projecting portions 40 are not formed, cannot be brought into close contact with the side wall surface 322H of the annular groove 322 because of the presence of the first side-surface side projecting portions 40. Therefore, at least in a vicinity of the first side-surface side projecting portions 40, a minimum space (space having a width corresponding to the projection height H1 in the X-direction) into which the fluid can flow is reliably ensured between the side wall surface 322H of the annular groove 322 and the first side surface 20. Therefore, the seal ring 10 of this embodiment can maintain a flow rate of the fluid flowing between the side wall surface 322H of the annular groove 322 and the first side surface 20 to a given amount larger than zero. In the related-art seal ring without the first side-surface side projecting portions 40A, however, a possibility of close contact between the side wall surface 322H of the annular groove 322 and the first side surface 20 without any gap cannot be eliminated. Therefore, the flow rate of the fluid flowing between the side wall surface 322H of the annular groove 322 and the first side surface 20 becomes zero in some cases. Thus, after the activation of the pump, the outer peripheral surface 60 of the seal ring 10 of this embodiment is reliably brought into close contact with the inner peripheral surface 310S of the housing 310, and the second side surface 30 is brought into close contact with the side wall surface 322L of the annular groove 322. In this manner, leakage of the fluid can be suppressed.

Next, a sealing device using the seal ring 10 of this embodiment is described. The seal ring 10 of this embodiment can be used for a publicly-known sealing device using a member having an annular groove in which the seal ring 10 of this embodiment can be mounted. In this case, the annular groove may be formed in an outer peripheral surface of a shaft member or in an inner peripheral surface of a housing. A sealing device of this embodiment is now described below, taking a sealing device including a shaft member having an annular groove formed in an outer peripheral surface as a specific example.

Figure 4:
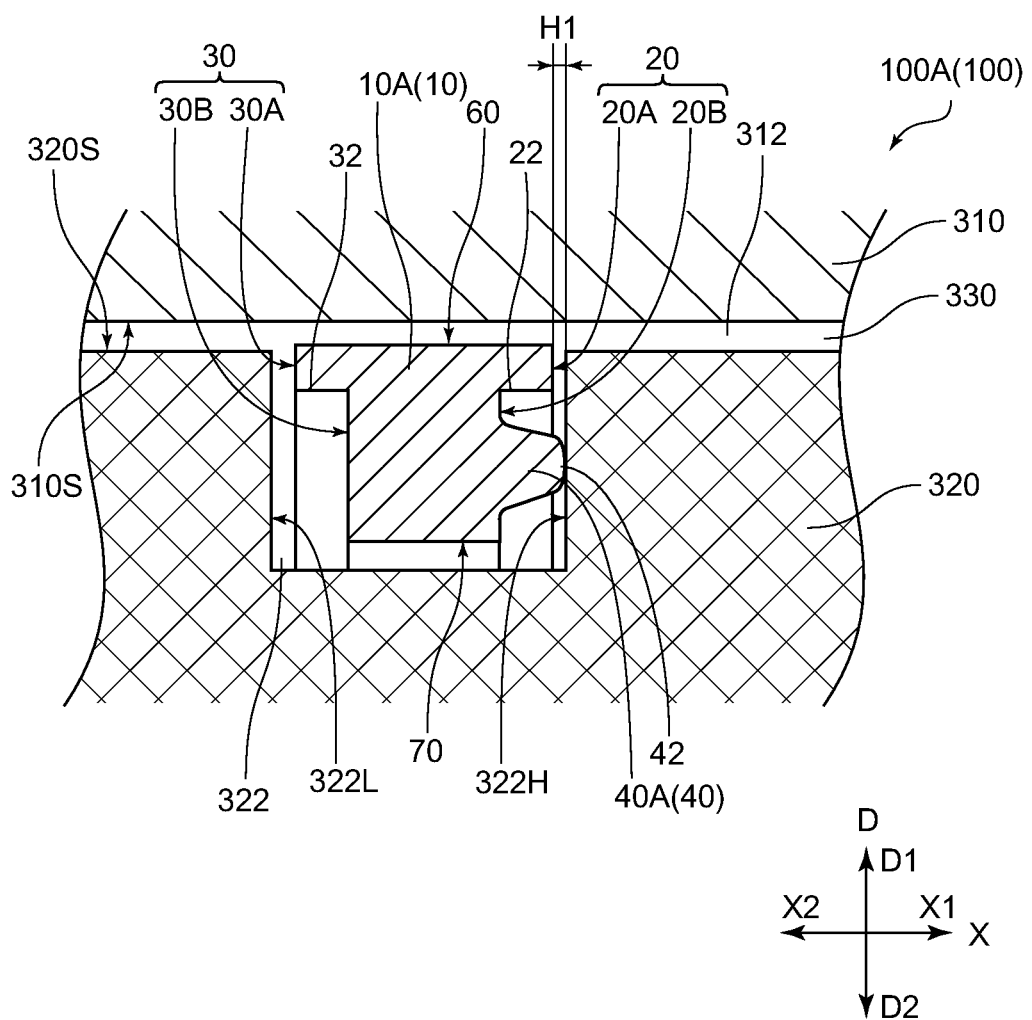
FIG. 4 is a schematic sectional view for illustrating an example of a sealing device (under a pump stopped state in which a sealing function is substantially lost) according to this embodiment, which uses the seal ring illustrated in FIG. 1 to FIG. 3.
Figure 5:
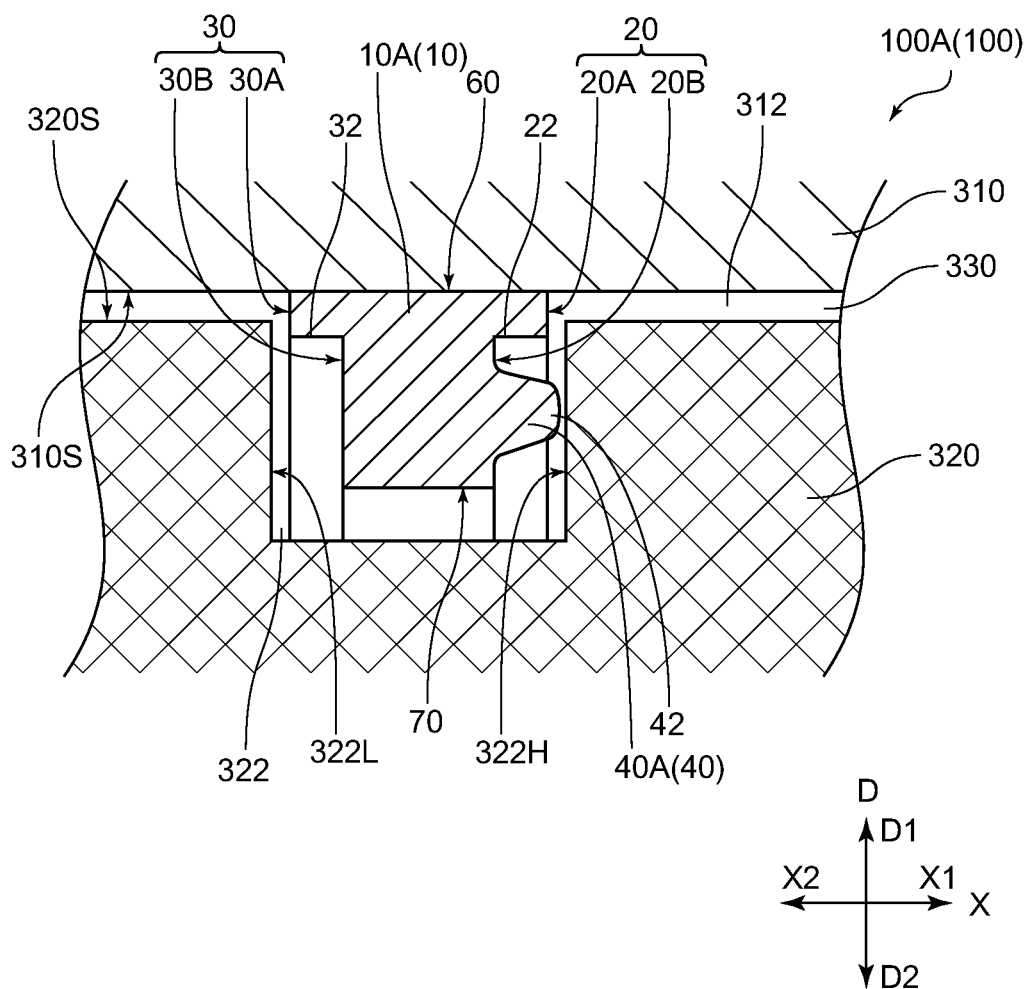
FIG. 5 is a schematic sectional view for illustrating an example of the sealing device (under a state immediately after activation of a pump in which the sealing function is being recovered) according to this embodiment, which uses the seal ring illustrated in FIG. 1 to FIG. 3.
Figure 6:
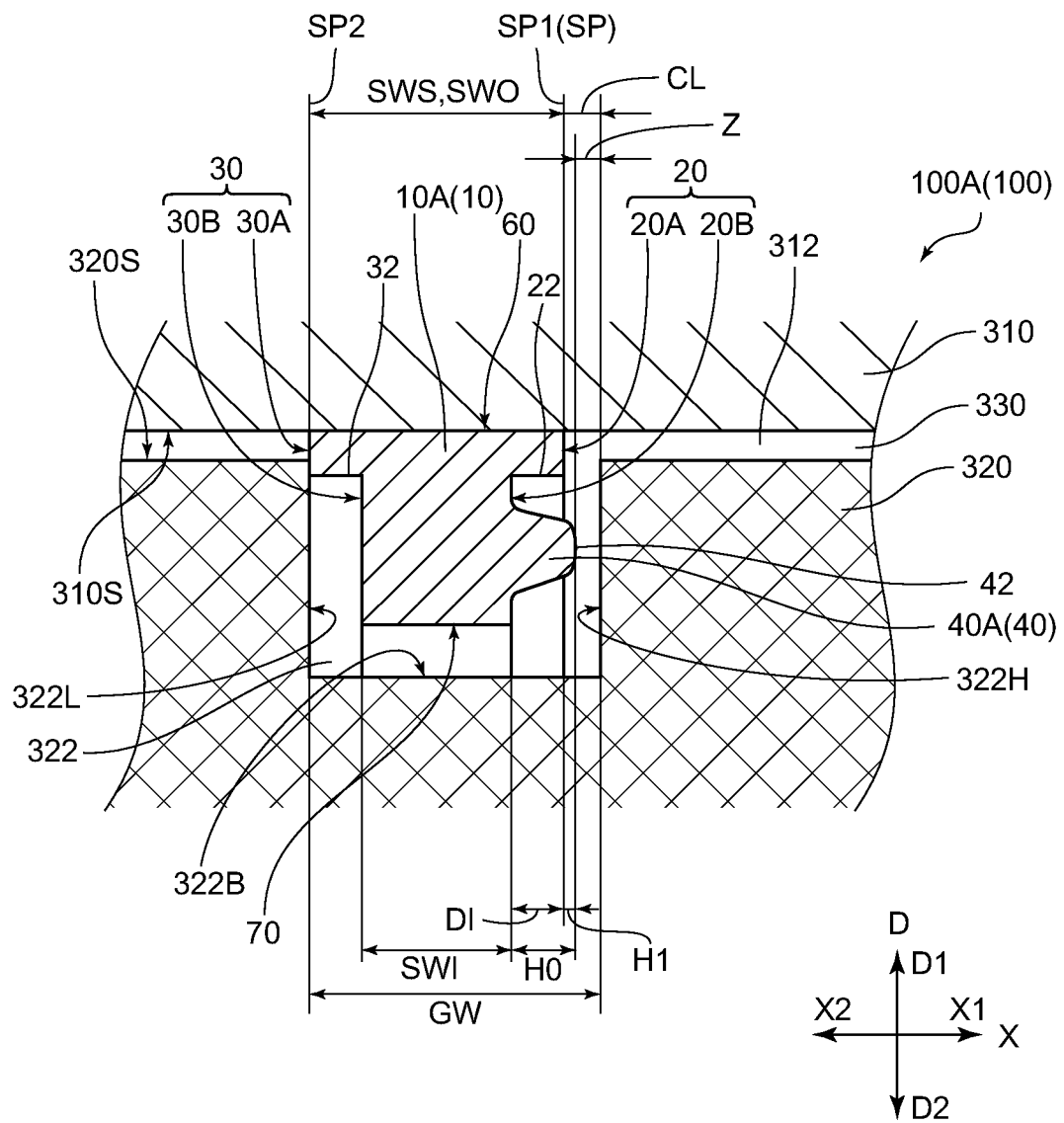
FIG. 6 is a schematic sectional view for illustrating an example of the sealing device (under a state in which a pressure difference of a fluid in an annular gap is brought into a high differential-pressure state to perfectly fulfill the sealing function) according to this embodiment, which uses the seal ring illustrated in FIG. 1 to FIG. 3.

FIG. 4 to FIG. 6 are schematic sectional views for illustrating an example of the sealing device of this embodiment, specifically, views for illustrating an example of the sealing device using the seal ring 10A illustrated in FIG. 1 to FIG. 3. FIG. 4 is a view for illustrating a case where the pressure difference of the fluid in the annular groove is in the zero differential-pressure state or the low differential-pressure state, that is, a case where the sealing function is substantially lost under the pump stopped state. FIG. 5 is a view for illustrating a case immediately after the activation of the pump, that is, a case where the sealing function is being recovered. FIG. 6 is a view for illustrating a case where the pressure difference of the fluid in the annular groove is in the high differential-pressure state, that is, a case where the sealing function is perfectly fulfilled.

The sealing device 100A (100) illustrated in FIG. 4 to FIG. 6 includes the housing 310, the shaft member 320, and the seal ring 10A of this embodiment. The housing 310 has the shaft hole 312. The shaft member 320 is arranged in the shaft hole 312 and is configured to rotate relative to the housing 310. The seal ring 10A of this embodiment is mounted in the annular groove 322 formed in the outer peripheral surface 320S of the shaft member 320. The annular groove 322 has a rectangular sectional shape. The sealing device 100A is a device having the same dimensions and structure as those of the related-art sealing device 300 illustrated in FIG. 18 to FIG. 20 except for the use of the seal ring 10A of this embodiment in place of the related-art seal ring 200.

Similarly to the sealing device 300, the sealing device 100A has a high-pressure side on one side (X1-direction side) of the center axis of the shaft member 320 and a low-pressure side on another side (X2-direction side), which are defined when the fluid is pressure-fed from the one end side (X1-direction side) of the annular gap 330. Further, high-pressure side projecting portions (first side-surface side projecting portions 40A) are formed on the high-pressure-side side surface (first side surface 20) of the seal ring 10A arranged in the annular groove 322. The distal end portions 42 of the high-pressure side projecting portions (first side-surface side projecting portions 40A) project most toward the high pressure side as compared to an entire surface of the side surface (first side surface 20) on the high pressure side except for the distal end portions 42.

Under the state as illustrated in FIG. 4, in which the pump is stopped over a long period of time or a short period of time, the pressure difference between the X1-direction side and the X2-direction side of the annular gap 330 is zero or extremely small. In this state, the seal ring 10A does not fulfill the sealing function. Thus, at this stage, a transmission using the sealing device 100A cannot perform the shift control.

At this stage, the pressure of the fluid does not substantially act even on the inner peripheral surface 70 side of the seal ring 10A. Thus, the seal ring 10A may be brought into a state of being separated from the side wall surface 322H of the annular groove 322 on the X1-direction side, the side wall surface 322L on the X2-direction side, and the inner peripheral surface 310S of the housing 310. Further, in general, a slight gap is often generated between the distal end portions 42 of the first side-surface side projecting portions 40A of the seal ring 10A and the side wall surface 322H. Even when the seal ring 10A comes closest to the side wall surface 322H on the high pressure side as illustrated in FIG. 4, however, only the distal end portions 42 of the first side-surface side projecting portions 40A of the seal ring 10A come into contact with the side wall surface 322H, and the first side surface 20 except for the distal end portions 42 cannot come into contact with the side wall surface 322H. Therefore, even when the seal ring 10A can constantly maintain the upright state inside the annular groove 32, a space in which the seal ring 10A can freely move inside the annular groove 322 can be limited to be smaller than that for the seal ring 200 illustrated in FIG. 18 to FIG. 20 by an amount corresponding to the projection height H1 of the first side-surface side projecting portions 40A. Therefore, as compared to the seal ring 200, a travel distance of the seal ring 10A, which is required to sufficiently fulfill the sealing function after activation of the pump, is further reduced with the seal ring 10A. Besides, even when the seal ring 10A is inclined before the activation of the pump, an angle required for correction of the inclination can be reduced. Thus, in the sealing device 100A of this embodiment, time required for the fulfillment of the sealing function at the time of activation of the pump can be shortened.

Next, under a state immediately after the activation of the pump as illustrated in FIG. 5, the fluid supplied from the X1-direction side of the annular gap 330 first flows into the annular groove 322. Therefore, the pressure of the fluid acts on the inner peripheral surface 70 of the seal ring 10A to increase a diameter of the seal ring 10A, and hence the outer peripheral surface 60 starts coming into close contact with the inner peripheral surface 310S of the housing 310. At the same time, the pressure of the fluid also acts on the first region 20A and the second region 20B of the first side surface 20 of the seal ring 10A, and hence the seal ring 10A is moved toward the X2-direction side of the annular gap 330. As a result, a gap between the first region 30A of the second side surface 30 of the seal ring 10A and the side wall surface 322L of the annular groove 322 on the X2-direction side is reduced. Hence, a pressure difference is generated between the X1-direction side and the X2-direction side of the annular gap 330 and starts increasing.

Finally, under a state after elapse of a given period of time from the activation of the pump as illustrated in FIG. 6, the outer peripheral surface 60 of the seal ring 10A comes into close contact with the inner peripheral surface 310S of the housing 310 over the entire periphery, and the second side surface 30 (the first region 30A thereof) being the low-pressure-side side surface comes into close contact with the side wall surface 322L on the low pressure side over the entire periphery. As a result, the sealing function is fulfilled. Thus, at this stage, the transmission using the sealing device 100A can perform reliable shift control. Further, at this stage, the seal ring 10A can be maintained in a completely upright posture inside the annular groove 322.

Details of dimensions of portions illustrated in FIG. 4 and FIG. 6 are as follows.

GW:

A width GW of the annular groove 322 is a width of the annular groove 322 in the direction (X-direction) parallel to the center axis of the shaft member 320.

SWS:

A standard width SWS of the seal ring 10 is a distance between (i) a first reference plane SP1 and (ii) a second reference plane SP2 illustrated in FIG. 6 in the direction (X-direction) parallel to the center axis of the seal ring 10. Here, in a case where it is assumed that the high-pressure side projecting portions (first side-surface side projecting portions 40) are not formed on the high-pressure-side side surface (first side surface 20) of the seal ring 10, (i) the first reference plane SP1 corresponds to a plane including a region of the high-pressure-side side surface (first side surface 20) of the seal ring 10, which is first contactable with the high-pressure-side side wall surface 322H of the annular groove 322, and being parallel to the radial direction D of the seal ring 10. Further, (ii) the second reference plane SP2 corresponds to a plane including a region of the low-pressure-side side surface (second side surface 30) of the seal ring 10, which is first contactable with the low-pressure-side side wall surface 322L of the annular groove 322, and being parallel to the radial direction D of the seal ring 10.

For example, in the example illustrated in FIG. 6, the first reference plane SP1 is a plane flush with the first region 20A, and the second reference plane SP2 is a plane flush with the first region 30A.

The first reference plane SP1 illustrated in FIG. 6 is a plane corresponding to the reference plane SP illustrated in FIG. 3, and the high-pressure-side side wall surface 322H illustrated in FIG. 6 is a plane corresponding to the imaginary plane VP illustrated in FIG. 3.

SWO:

A width SWO of the outer peripheral surface is a width of the outer peripheral surface 60 in the direction (X-direction) parallel to the center axis A1 of the seal ring 10.

SWI:

A width SWI of the inner peripheral surface is a width of the inner peripheral surface 70 in the direction (X-direction) parallel to the center axis A1 of the seal ring 10.

H0:

A height H0 of the high-pressure side projecting portions (first side-surface side projecting portions 40) is a height of the high-pressure side projecting portions (first side-surface side projecting portions 40) in the direction (X-direction) parallel to the center axis A1 of the seal ring 10 when a height of the base surface (the second region 20B in the example illustrated in FIG. 6) of the high-pressure side projecting portions (first side-surface side projecting portions 40) is defined as 0 mm. For example, in the example illustrated in FIG. 6, the height H0 is a height from the second region 20B to the top of each of the distal end portions 42. When the base surface is inclined with respect to the radial direction D of the seal ring 10, a height of a position, at which a straight line being parallel to the X-direction and passing through a top of the high-pressure side projecting portion (first side-surface side projecting portion 40) intersects with the base surface, is defined as 0 mm. Further, when the low-pressure side projecting portion (second side-surface side projecting portion 46) is formed on the seal ring, the height H0 of the low-pressure side projecting portion (second side-surface side projecting portion 46) can also be determined based on the same idea.

H1:

When a height of the first reference plane SP1 is defined as 0 mm, the projection height H1 of the high-pressure side projecting portions (first side-surface side projecting portions 40) is a height (height from the first reference plane SP1 to the tops of the distal end portions 42) of the high-pressure side projecting portions (first side-surface side projecting portions 40) in the direction (X-direction) parallel to the center axis A1 of the seal ring 10. The projection height H1 illustrated in FIG. 6 is equivalent to the projection height H1 illustrated in FIG. 3. Further, when the low-pressure side projecting portion (second side-surface side projecting portion 46) is formed on the seal ring, the projection height H1 of the low-pressure side projecting portion (second side-surface side projecting portion 46) can also be determined based on the same idea.

DI:

A level-difference portion height DI is a height of each of the level-difference portions 22 and 32 in the direction (X-direction) parallel to the center axis A1 of the seal ring 10.

CL:

A side clearance CL is a gap length obtained by subtracting the standard width SWS of the seal ring 10 from the width GW of the annular groove 322.

Z:

A maximum travel distance Z is a length obtained by subtracting the projection height H1 of the high-pressure side projecting portion (first side-surface side projecting portion 40) from the side clearance CL. The maximum travel distance Z corresponds to a range in which the seal ring 10 can move maximally in the X-direction under a state in which the seal ring 10 is upright inside the annular groove 322. When the first side-surface side projecting portions 40 are not formed on the first side surface 20, the maximum travel distance Z is equal to the side clearance CL.

In the sealing device 100 of this embodiment, the projection height H1 of the high-pressure side projecting portions (first side-surface side projecting portions 40) is set so as to satisfy Expression (A). In this manner, in the sealing device using the seal ring 10 of this embodiment, when the pump configured to pressure-feed the fluid is activated, the sealing function of the fluid can be fulfilled within a short period of time.

$$H1>0 \qquad \text{•Expression (A)}$$

For assembly of the sealing device 100 of this embodiment, the dimensions of the portions only need to be suitably selected to satisfy Expression (B) so that the seal ring 10 can be mounted in the annular groove 322. When Expression (B) is not satisfied, the first side-surface side projecting portions 40 disturb insertion and mounting of the seal ring 10 in the annular groove 322. It is preferred that the projection height H1 be smaller than the side clearance CL.

$$CL \geq H1 \qquad \text{•Expression (B)}$$

The dimensions of the portions of the seal ring 10 are suitably selected in accordance with the dimensions of the annular groove 322 in which the seal ring 10 is mounted. It is preferred that the projection height H1 be larger than 0 mm. With the projection height H1 of 0 mm, the sealing function for the fluid cannot be fulfilled within a short period of time when the pump configured to pressure-feed the fluid is activated.

Meanwhile, the height H0 of the first side-surface side projecting portions 40A can be suitably selected. However, when the height H0 of the first side-surface side projecting portions 40A is excessively large, the first side-surface side projecting portions 40A are liable to break at the time of handling of the seal ring 10. Therefore, it is preferred that the height H0 be equal to or smaller than 0.5 mm. Here, when the height H0 is equal to or smaller than 0.5 mm, it is preferred that the projection height H1 be equal to or smaller than 0.5 mm, more preferably, equal to or smaller than 0.23 mm. Further, it is preferred that the projection height H1 satisfy Expression (2) to Expression (4) in accordance with a sectional shape on a plane orthogonal to the circumferential direction C of the seal ring 10.

When the seal ring 10 has the first side-surface side projecting portions 40A having the second region 20B being parallel to the radial direction D as the bottom surface as exemplified in FIG. 3 (T-shaped type), it is preferred that Expression (2) be satisfied.

$$H0=DI+H1 \leq 0.5 \text{ mm} \qquad \text{•Expression (2)}$$

It is preferred that the standard width SWS of the seal ring 10 in the X-direction be set so as to satisfy $1.0 \text{ mm} \leq SWS \leq 2.0 \text{ mm}$ and that the height DI of the level-difference portion 22 be set so as to satisfy $0.10 \times SWS \leq DI \leq 0.20 \times SWS$. Thus, the height DI of the level-difference portion 22 falls within a range of $0.1 \text{ mm} \leq DI \leq 0.4 \text{ mm}$. Therefore, an upper limit value of the projection height H1 in this case is equal to or smaller than 0.4 mm.

Figure 9:
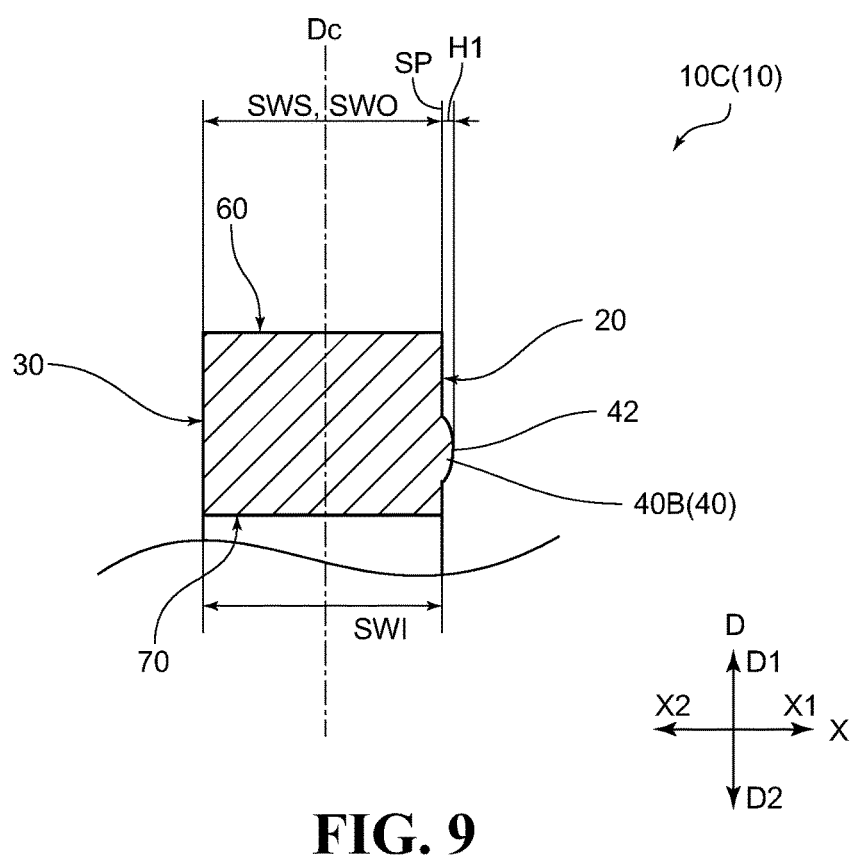
FIG. 9 is a schematic sectional view for illustrating another example of the seal ring according to this embodiment.

Further, when the seal ring 10 includes the first side-surface side projecting portion 40B having the first side surface 20 without the level-difference portion 22 as the base surface as exemplified in FIG. 9 (rectangular cross section type), it is preferred that Expression (3) be satisfied. Therefore, the upper limit value of the projection height H1 in this case is equal to or smaller than 0.5 mm.

$$H0=H1 \leq 0.5 \text{ mm} \qquad \text{•Expression (3)}$$

Figure 10:
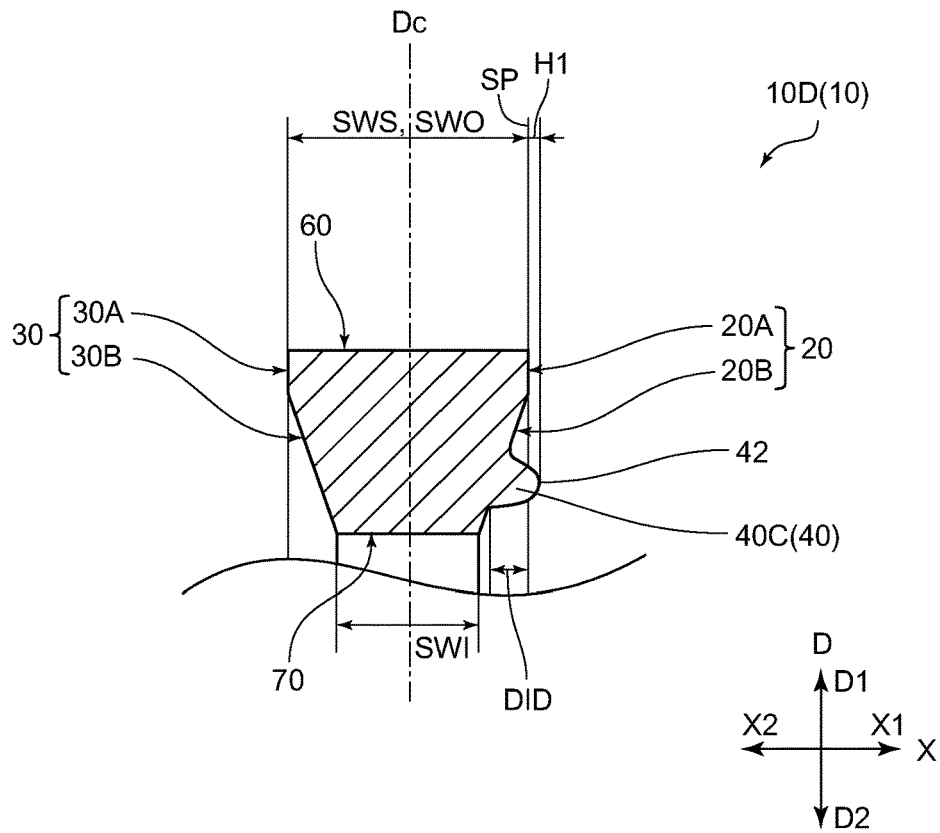
FIG. 10 is a schematic sectional view for illustrating another example of the seal ring according to this embodiment.

Further, when the seal ring 10 includes the first side-surface side projecting portion 40C having the second region 20B inclined with respect to the radial direction D as the base surface as exemplified in FIG. 10 (inner-periphery side inverted trapezoid type), it is preferred that Expression (4) be satisfied.

$$H0=DID+H1 \leq 0.5 \text{ mm} \qquad \text{•Expression (4)}$$

In Expression (4), DID corresponds to a height from a bottom of the first side-surface side projecting portion 40C in the radial direction Don the inner peripheral surface 70 side of a seal ring 10D to the first region 20A in the direction (X-direction) parallel to the center axis A1 of the seal ring 10D illustrated in FIG. 10. A lower limit value of DID is a value larger than 0 mm, and therefore the upper limit value of the projection height H1 in this case is smaller than 0.5 mm.

Meanwhile, it is more preferred that a lower limit value of the projection height H1 be equal to or larger than 0.04 mm regardless of the sectional shape on the plane orthogonal to the circumferential direction C of the seal ring 10.

The maximum travel distance Z may be suitably selected. However, in terms of good mountability obtained when the seal ring 10 is mounted in the annular groove 322, it is preferred that a lower limit value of the maximum travel distance Z be equal to or larger than 0.03 mm. Further, in terms of ease in ensuring a general range, which is from about 0.10 mm to about 0.25 mm, of the side clearance CL, it is preferred that an upper limit value of the maximum travel distance Z be equal to or smaller than 0.08 mm.

The projection height H1 with respect to the circumferential direction C may be varied within the range that satisfies Expression (A) and Expression (B). However, in general, it is particularly preferred that the projection height H1 always be a constant value with respect to the circumferential direction C. In this manner, suppression of uneven wear of the seal ring 10 in the circumferential direction C is facilitated.

Next, details of the seal ring 10 and the sealing device 100 of this embodiment and other embodiments are described.

Although the plurality of first side-surface side projecting portions 40 may be formed discretely along the circumferential direction C as exemplified in FIG. 1 and FIG. 2, the first side-surface side projecting portion 40 may be formed continuously along the circumferential direction C.

Meanwhile, when the plurality of the first side-surface side projecting portions 40 are formed discretely along the circumferential direction C, the number thereof only needs to be at least three in terms of suppression of the inclination of the seal ring 10. However, in terms of the suppression of wear of the first side-surface side projecting portions 40 of the seal ring 100 inside the annular groove 322, it is preferred that the number of the first side-surface side projecting portions 40 be four or larger, more preferably, six or larger. Further, although an upper limit value of the number of the first side-surface side projecting portions 40 is not particularly limited, it is preferred that the number of the first side-surface side projecting portions 40 be about twelve or smaller in practice. Further, it is preferred that the first side-surface side projecting portions 40 be arranged at equal intervals or at approximately equal intervals in the circumferential direction C. For example, when the number of the first side-surface side projecting portions 40 is three, it is preferred that an angle formed between two adjacent first side-surface side projecting portions 40 in the circumferential direction C and the center axis A1 fall within a range of 120°±30°. When the number of the first side-surface side projecting portions 40 is four, it is preferred that the angle fall within a range of 90°±30°.

It is preferred that the first side-surface side projecting portions 40 be a plurality of discrete-type projecting portions formed discretely along the circumferential direction C rather than a continuous-type projecting portion formed continuously along the circumferential direction C. Even when the distal end portions 42 of the individual first side-surface side projecting portions 40 formed discretely along the circumferential direction C are held in contact with the side wall surface 322H of the annular groove 322 on the X1-direction side, a flow path for the fluid can be reliably ensured along the radial direction D on both sides of each of contact portions of the discrete-type projecting portions in the circumferential direction C. Therefore, as compared to the continuous projecting portion, the fluid pressure-fed from the X1-direction side of the annular gap 330 can quickly flow to the inner peripheral surface 70 side with the discrete-type projecting portions. Therefore, even when the seal ring 10 is inclined inside the annular groove 322, the seal ring 10 can be quickly brought into the upright state.

Further, in the case of the related-art seal ring 200, the entire surface of the first region 20A of the first side surface 20 in the circumferential direction C disadvantageously comes into contact with the side wall surface 322H of the annular groove 322 on the X1-direction side in some cases. Therefore, as compared even to the related-art seal ring 200, the fluid pressure-fed from the X1-direction side of the annular gap 330 can quickly flow to the inner peripheral surface 70 side in the seal ring 10 of this embodiment including the discrete-type projecting portions as the first side-surface side projecting portions 40. Therefore, even when the seal ring 10 is inclined inside the annular groove 322, the seal ring 10 can be quickly brought into the upright state.

Further, in terms of ease in quickly bringing the seal ring 10 in the inclined state into the upright state, it is only necessary that at least three discrete-type projecting portions be arranged at equal intervals or approximately equal intervals in the circumferential direction C.

Although a shape of the distal end portion 42 of each of the first side-surface side projecting portions 40 is not particularly limited, it is preferred that a sectional shape of a cross section orthogonal to the circumferential direction C be any shape selected from an arc shape exemplified in FIG. 7(A) and a flat surface shape exemplified in FIG. 7(B). In the seal ring 10A illustrated in FIG. 1 to FIG. 6, the shape of the distal end portion 42 is an arc shape similar to that illustrated in FIG. 7(A). In this case, it is preferred that the sectional shape to be selected be determined in terms of suppression of a dimensional change of the seal ring 10 in the X-direction, which is caused due to initial wear.

For example, when the first side-surface side projecting portions 40 are formed discretely in the circumferential direction C, in particular, when the number of the first side-surface side projecting portions 40 is small (for example, when the number is from three to five), a contact area between the distal end portions 42 and the side wall surface 322H becomes inevitably smaller. Therefore, the dimensional change of the seal ring 10 in the X-direction due to the initial wear is liable to increase. Therefore, in this case, in terms of suppression of the dimensional change of the seal ring 10 in the X-direction due to the initial wear, it is preferred that the sectional shape of the distal end portion 42 be a flat-surface shape or an arc shape having a relatively large curvature radius r.

When the first side-surface side projecting portion 40 is formed continuously along the circumferential direction C, or when a large number of the first side-surface side projecting portions 40 are formed discretely in the circumferential direction C (for example, when the number is six or larger), the contact area between the distal end portions 42 and the side wall surface 322H becomes inevitably larger. Therefore, a wear resistance between the seal ring 10 and the side wall surface 322H is liable to be increased. Therefore, in this case, in terms of suppression of the wear resistance, it is preferred that the sectional shape of the distal end portion 42 be the arc shape.

When the sectional shape of the distal end portion 42 is the arc shape, the curvature radius r thereof may be suitably selected. When an outer diameter of the seal ring 10 falls within a range of from 15 mm to 80 mm, and a length T of the seal ring 10 in the radial direction D of the seal ring 10 falls within a range of from 1.0 mm to 2.5 mm, it is preferred that the curvature radius r fall within any one of ranges (1) and (2) described below. First, (1) when the first side surface 20 is formed only of a flat surface which is entirely in flush without the level-difference portion 22 as exemplified in FIG. 9, it is preferred that the curvature radius r satisfy a relationship of r≤(T−0.2)/2. Further, (2) when the first side surface 20 has the level-difference portion 22 and is formed of two flat surfaces including the first region 20A and the second region 20B as exemplified in FIG. 3, FIG. 8, and FIG. 14, it is preferred that the curvature radius r satisfy a relationship of r≤T2/2. Here, T2 is a length of the second region 20B in the radial direction D. In terms of production of a die for use in manufacture of the seal ring 10, it is preferred that the curvature radius r be equal to or larger than 0.10 mm, and the curvature radius r may be equal to or larger than 0.05 mm.

Further, although the sectional shape of the cross section orthogonal to the circumferential direction C of a main body portion 44 of the first side-surface side projecting portion 40 except for the distal end portion 42 is not particularly limited, the shape may have a width in the radial direction D with respect to the direction (X1-direction) toward the distal end portion 42, which is always constant, as illustrated in FIG. 7(C), or the shape may have a width in the radial direction D, which gradually decreases in the direction (X1-direction) toward the distal end portion 42 as illustrated in FIG. 7(D). Further, in terms of improvement of breakage resistance of the first side-surface side projecting portions 40, the embodiment illustrated in FIG. 7(D) is preferred more than the embodiment illustrated in FIG. 7(C).

It is particularly preferred that the sectional shape of the cross section of the seal ring 10 of this embodiment, which is orthogonal to the circumferential direction C, be asymmetric (line asymmetric) with respect to a radial center line Dc which divides the sectional shape into two corresponding to one side and another side of the center axis A1. In this case, for the assembly of the sealing device 100, the seal ring 10 is required to be mounted in the annular groove 322 in consideration of a difference between the first side surface 20 side and the second side surface 30 side of the seal ring 10. Therefore, in this regard, the seal ring 10 of this embodiment is inferior to the related-art seal ring having a symmetric (line symmetric) with respect to the radial center line Dc as exemplified in Patent Literature 1 and Patent Literature 2 in ease of assembly of the sealing device 100.

However, in order to improve distinguishability between the first side surface 20 side and the second side surface 30 side to thereby improve the ease of assembly, a mark or the like can be printed, or a structure with the emphasized asymmetry of the seal ring 10 with respect to the radial center line Dc of the seal ring 10 can also be used. When the structure with the emphasized asymmetry of the seal ring 10 with respect to the radial center line Dc is adopted, it is preferred that only the first side-surface side projecting portions 40 be formed on the first side surface 20 as the projecting portions formed on the first side surface 20 and the second side surface 30 as in the case of the seal ring 1 OA exemplified in FIG. 3. In other words, it is preferred that no projecting portion be formed on the second side surface 30.

The projecting portion may also be formed on the second side surface 30 as needed although the degree of asymmetry is decreased. When the projecting portion is formed on the second side surface 30, however, a distal end portion of the projecting portion is required to be flush with a region projecting most toward an outward side (outermost peripheral side region) from the entire second side surface except for the distal end portion or be present on an inward side of the outermost peripheral side region. FIG. 8 is a schematic sectional view for illustrating another example of the seal ring of this embodiment, specifically, is a sectional view for illustrating a seal ring 10B (10) including a second side-surface side projecting portion 46 formed on the second side surface 30 side.

Figure 8:
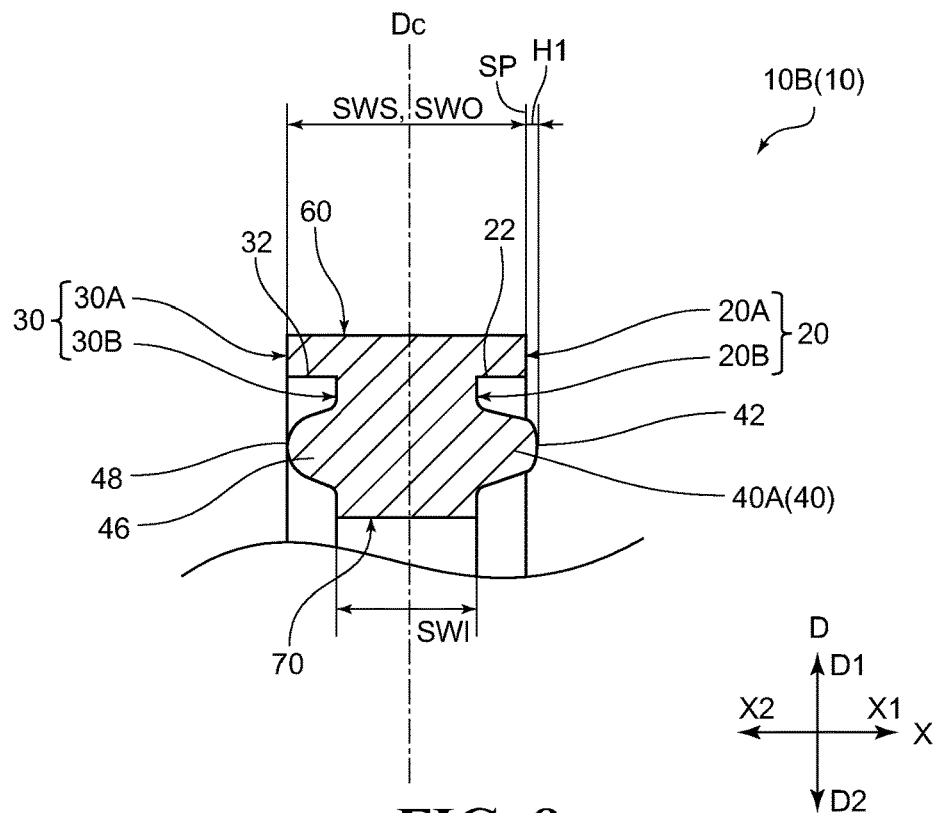
FIG. 8 is a schematic sectional view for illustrating another example of the seal ring according to this embodiment.

The seal ring 10B illustrated in FIG. 8 has the same shape and dimensions as those of the seal ring 10A exemplified in FIG. 1 to FIG. 3 except for the second side-surface side projecting portion 46 formed on the second region 30B of the second side surface 30. A sectional shape of a distal end portion 48 of the second side-surface side projecting portion 46 is an arc shape. In addition, the distal end portion 48 is flush with the first region 30A (outermost peripheral side region) of the entire surface of the second side surface 30 except for the distal end portion 48, which projects most toward the outward side.

Thus, when the pressure difference of the fluid in the annular gap 330 is brought into the high differential-pressure state, the first region 30A of the second side surface comes into close contact with the low-pressure-side side wall surface 322L of the annular groove 322 so as to be freely slidable, thereby fulfilling the sealing function. Further, at the same time, the distal end portion 48 of the second side-surface side projecting portion 46 comes into close contact with the low-pressure-side side wall surface 322L of the annular groove 322 so as to be freely slidable. In this case, similarly to the seal ring described in Patent Literature 2, the seal ring 10B fulfills the sealing function and, at the same time, can also achieve reduction in surface pressure and in heat generation amount.

When the suitable second side-surface side projecting portion 46 is formed on the second side surface 30, the distal end portion 48 of the second side-surface side projecting portion 46 only needs to be flush with a portion of the second side surface, which projects most toward an outward side (the first region 30A in the example illustrated in FIG. 8) or be provided on an inward side of this portion. Further, as a shape of the distal end portion 48 and a shape of the main body portion of the second side-surface side projecting portion 46, the shapes exemplified in FIG. 7 can be suitably selected. Further, in the example illustrated in FIG. 8, the first side-surface side projecting portions 40A formed discretely in the circumferential direction C and the second side-surface side projecting portions 46 formed discretely in the circumferential direction C are arranged at the same positions in the circumferential direction C. However, the first side-surface side projecting portions 40A and the second side-surface side projecting portions 46 may be arranged at different positions. Further, the number of the first side-surface side projecting portions 4 OA and the number of the second side-surface side projecting portions 46 may be equal to or different from each other. Further, the second side-surface side projecting portion 46 may be formed continuously in the circumferential direction C.

The sectional shape of the cross section of the seal ring 10 of this embodiment, which is orthogonal to the circumferential direction C, except for the first side-surface side projecting portions 40, is not particularly limited as long as the sealing function can be fulfilled without any problem under the high differential-pressure state. FIG. 9 is a schematic sectional view for illustrating another example of the seal ring of this embodiment. A seal ring 10C (10) illustrated in FIG. 9 has a rectangular sectional shape of a cross section orthogonal to the circumferential direction C except for the first side-surface side projecting portions 40. Specifically, the level-difference portion 22 is not formed on the first side surface 20, and the level-difference portion 32 is not formed on the second side surface 30. A first side-surface side projecting portion 40B (40) is formed on the first side surface 20. In the seal ring 10C, a width SWI of the inner peripheral surface 70 in the direction (X-direction) parallel to the center axis A1 has a length equal to the width SWO of the outer peripheral surface 60.

As in the case of the seal ring 10A illustrated in FIG. 6, the seal ring 10B illustrated in FIG. 8, and the like, however, it is preferred that the width SWI of the inner peripheral surface 70 in the direction (X-direction) parallel to the center axis A1 be smaller than the width SWO of the outer peripheral surface 60. In this case, under a state in which the sealing function is fulfilled by the seal ring 10, a non-contact portion like the second region 30B, which does not come into contact with the low-pressure-side side wall surface 322, is formed on the second side surface 30. Thus, the pressure of the fluid acting on a surface of the seal ring 10 and inner wall surfaces of the annular groove 322 acts on the non-contact portion and a portion of the low-pressure-side side wall surface 322L, which is opposed to the non-contact portion, in a distributed manner. Thus, as a result, the pressure of the fluid acting on the inner wall surfaces of the annular groove 322 can be relatively reduced so as to decrease the wear resistance.

As the seal ring 10 having the sectional shape with the width SWI of the inner peripheral surface 70 set smaller than the width SWO of the outer peripheral surface 60, a seal ring 10D (10) illustrated in FIG. 10, which has an inverted trapezoidal sectional shape on the inner periphery side, can be exemplified. In the seal ring 10D, the first region 20A of the first side surface 20 and the first region 30A of the second side surface 30 are respectively formed of surfaces parallel to the radial direction D, as in the case of the seal rings 10A and 10B. However, the second regions 20B and 30B form tapered surfaces inclined inward from inner periphery-side end portions of the first regions 20A and 30A in the radial direction D toward the inner peripheral surface 70, respectively. A first side-surface side projecting portion 40C (40) is formed on the second region 20B of the first side surface 20. Further, the width SWI of the inner peripheral surface 70 is set smaller than the width SWO of the outer peripheral surface 60.

A position at which the first side-surface side projecting portion 40 in the radial direction D is arranged is not particularly limited as long as the first side-surface side projecting portion 40 can come into contact with the side wall surface 322H when the seal ring 10 is mounted in the annular groove 322. However, it is suitable that the first side-surface side projecting portion 40 be formed so that the distal end portion 42 is positioned with respect to the thickness T of the seal ring 10 (length in the radial direction D) so as to fall within a range of from about 0.2T to 0.7T based on the inner peripheral surface 70 side as a reference (0). It is more suitable that the first side-surface side projecting portion 40 be formed so that the distal end portion 42 is positioned within a range of from about 0.3T to 0.6T.

The sectional shape of the cross section of the seal ring 10 of this embodiment, which is orthogonal to the circumferential direction C, except for the first side-surface side projecting portions 40 may be always constant in the circumferential direction C except for a vicinity of the joint portion 50, but may also be varied. The seal ring 10 having such a structure is now described below with reference to the drawings.

Figure 11:
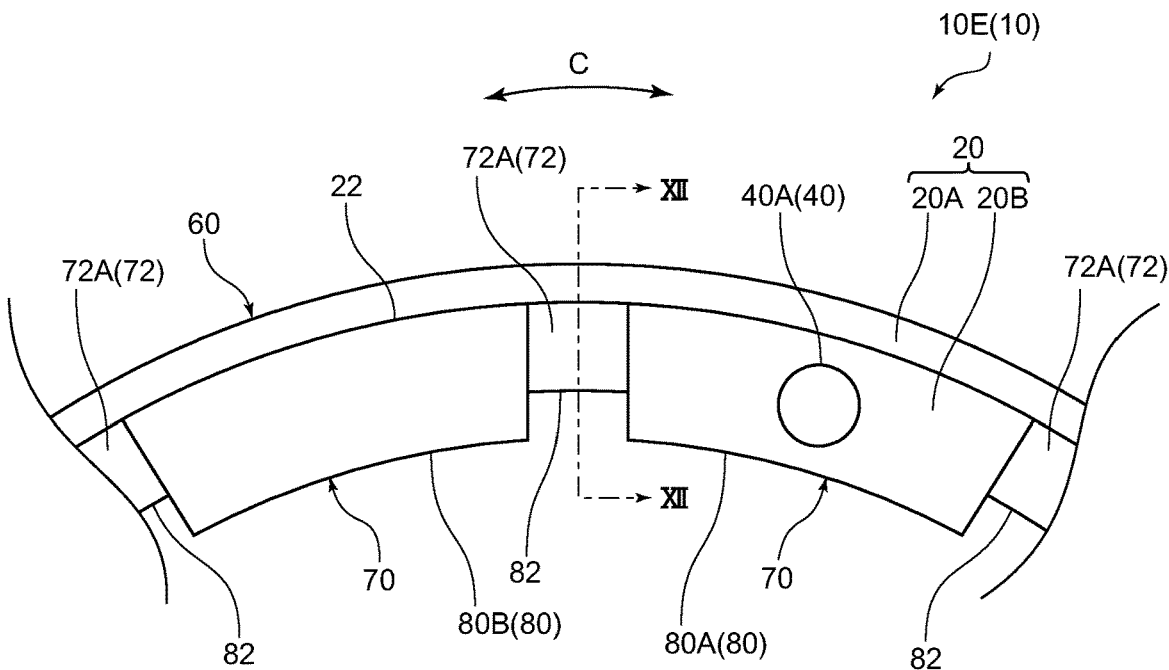
FIG. 11 is an enlarged plan view for illustrating another example of the seal ring according to this embodiment.
Figure 12:
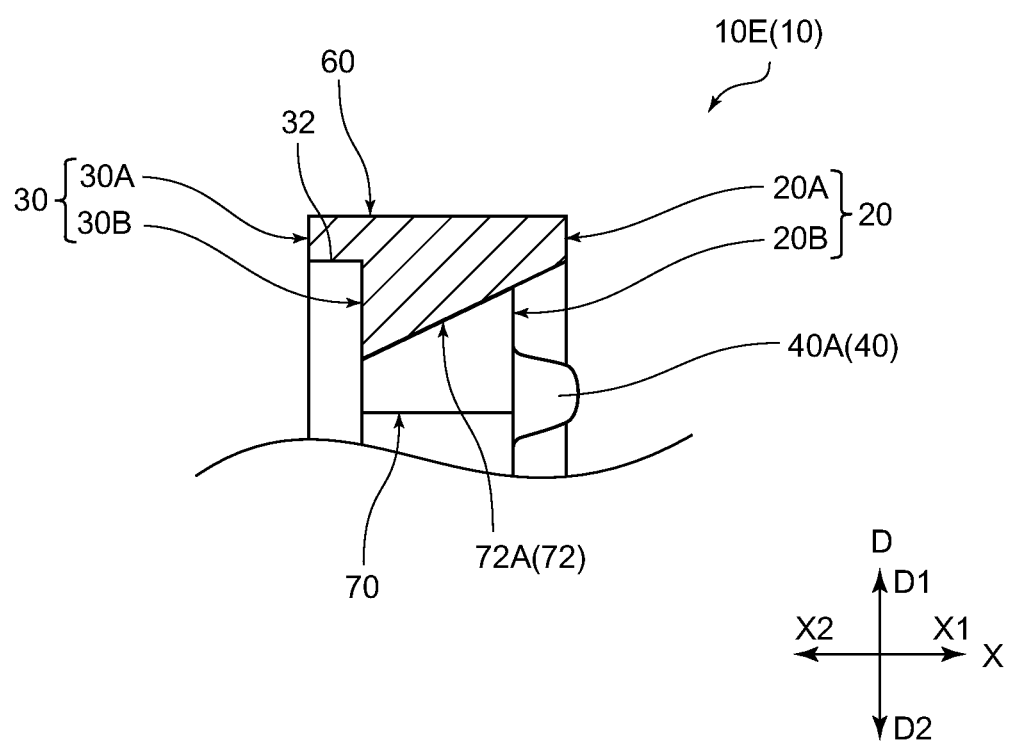
FIG. 12 is a schematic sectional view taken along the line XII-XII in FIG. 11.

FIG. 11 and FIG. 12 are schematic views for illustrating another example of the seal ring of this embodiment. FIG. 11 is an enlarged plan view of the seal ring, specifically, an enlarged plan view of the first side surface. FIG. 12 is a sectional view taken along the line XII-XII in FIG. 11.

A seal ring 10E (10) of this embodiment illustrated in FIG. 11 includes first portions 80 and second portions 82 which have different sectional shapes of a cross section orthogonal to the circumferential direction C except for the first side-surface side projecting portions 40. The first portions 80 and the second portions 82 are arranged alternately in the circumferential direction C. In the example illustrated in FIG. 11, the first side-surface side projecting portion 40 is formed on the first side surface 20 of at least one first portion 80A (80) selected from the plurality of first portions 80 arranged along the circumferential direction C. In the example illustrated in FIG. 11, there is illustrated a state in which the second portion 82, a first portion 80B (80) without the first side-surface side projecting portion 40 formed on the first side surface 20, the second portion 82, the first portion 80A with the first side-surface side projecting portion 40 formed on the first side surface 20, and the second portion 82 are arranged in the stated order from one side in the circumferential direction C (left side in FIG. 11) to another side (right side in FIG. 11).

In the example illustrated in FIG. 11, a sectional shape of a cross section of the first portion 80A with the first side-surface side projecting portion 40 formed on the first side surface 20, which is orthogonal to the circumferential direction C, is similar to that of the seal ring 10A illustrated in FIG. 3. Further, a sectional structure of the first portion 80A is not particularly limited as long as the first side-surface side projecting portions 40 are formed on the first side surface 20. For example, a sectional structure of the seal ring 10D illustrated in FIG. 10 or the like can be suitably selected. Further, a sectional structure of the first portion 80B is the same as that of the first portion 80A except for the absence of the first side-surface side projecting portions 40 on the first side surface 20. Further, although lengths of the first portions 80 in the circumferential direction C are equal in the example illustrated in FIG. 11, the lengths may be different. The same applies to the second portions 82. For example, the length of the first portions 80A can be set three times as large as the length of the first portions 80B.

Although the first side-surface side projecting portions 40 are formed on the first side surfaces 20 of the first portions 80 in the example illustrated in FIG. 11, the first side-surface side projecting portions 40 may be formed on the first side surfaces 20 of the second portions 82 or may be formed on both the first side surfaces 20 of the first portions 80 and the first side surfaces 20 of the second portions 82.

Further, as illustrated in FIG. 12, an inner peripheral surface 72A (72) of the second portion 82 is formed on the outer periphery side of the inner peripheral surface 70 of the first portion 80. Therefore, in the sealing device 100 using the seal ring 10E illustrated in FIG. 11 and FIG. 12, when the pump is activated, the fluid first acts on the inner peripheral surface 72 of the second portion 82 before acting on the inner peripheral surface 70 of the first portion 80. Therefore, within a shorter period of time after the activation of the pump, the seal ring 10E can be moved toward the inner peripheral surface 310S of the housing 310.

In the seal ring 10E illustrated in FIG. 12, the first side surface 20 of the second portion 82 is formed only of the first region 20A. Further, the inner peripheral surface 72A forms a tapered surface which is tapered to extend in the D2-direction from an inner peripheral side end portion of the first region 20A as a starting point to the X2-direction side. The first side surfaces 20 form a continuous flush surface and the second side surfaces 30 form a continuous flush surface over the first portions 80 and the second portions 82.

Figure 13A:
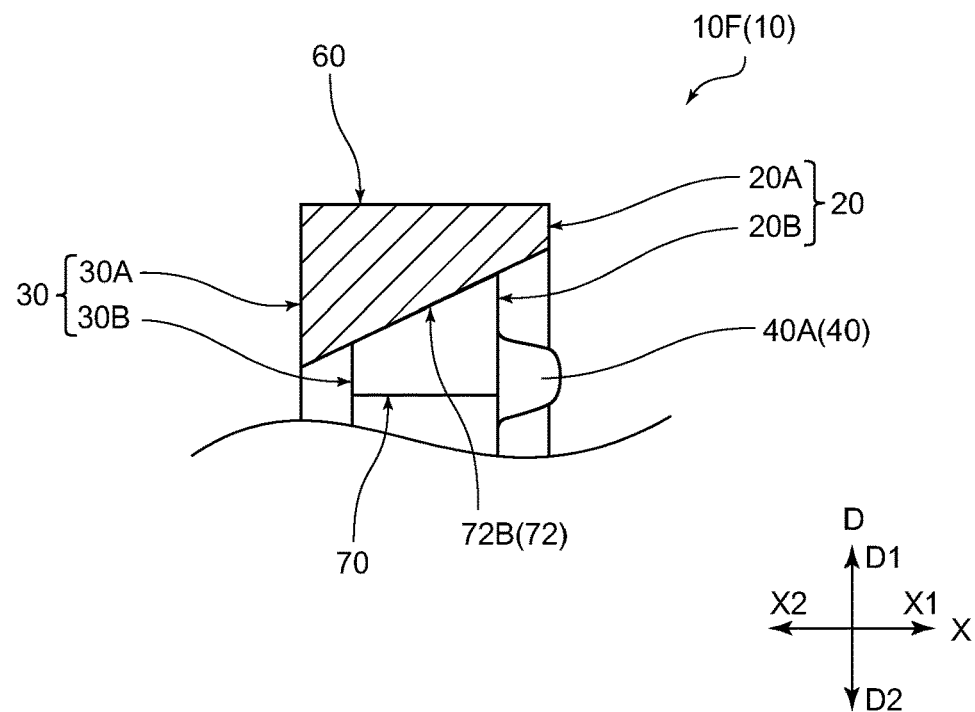
FIG. 13(A) is a view for illustrating a first modification example.
Figure 13B:
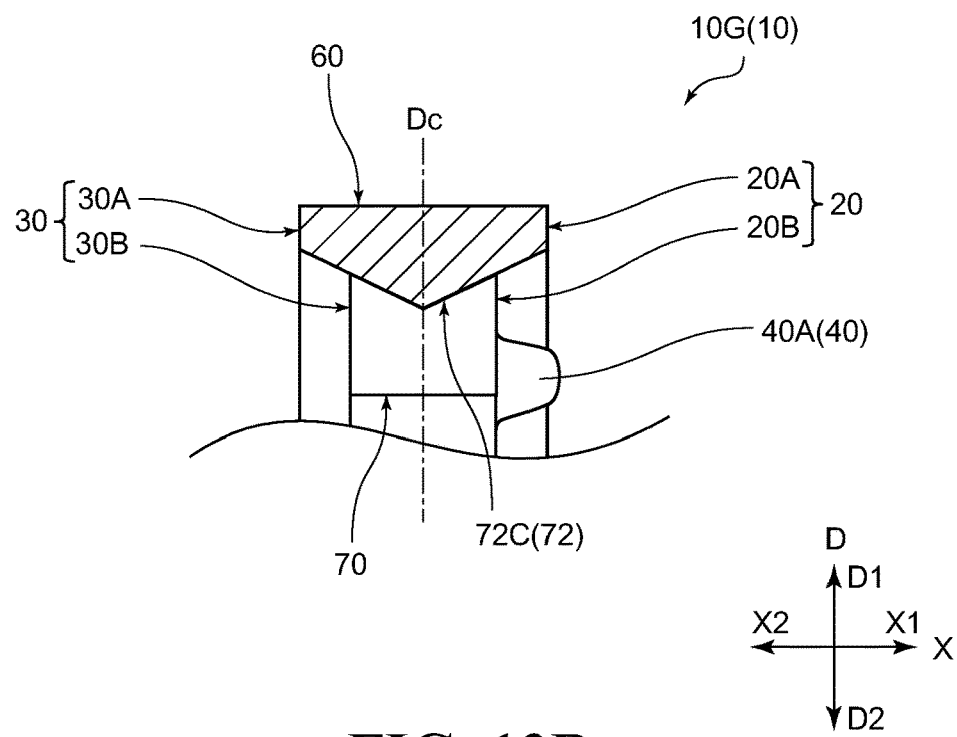
FIG. 13(B) is a view for illustrating a second modification example.

A sectional structure of the second portion 82 is not limited to that of the example illustrated in FIG. 12. For example, sectional structures illustrated in FIG. 13 can also be used. A seal ring 10F (10) and a seal ring 10G (10) illustrated in FIG. 13 are seal rings having the same shape and structure as those of the seal ring 10E illustrated in FIG. 11 and FIG. 12 except for a difference in sectional structure of the second portion 82. In the seal ring 10F illustrated in FIG. 13(A), the second side surface 30 of the second portion 82 is not made completely flush with the first portion 80, and the level-difference portion 32 is omitted from the second portion 82. Further, an inner peripheral surface 72B (72) illustrated in FIG. 13(A) is inclined at an angle similar to that of the inner peripheral surface 72A illustrated in FIG. 12, and one end on the X2-direction side matches with an inner periphery side end portion of the second side surface 30 (first region 30A). Further, in the seal ring 10G illustrated in FIG. 13(B), an inner peripheral surface 72C (72) is formed of two tapered surfaces having the same angle of inclination, which are line symmetric with respect to the radial center line Dc, and has a shape projecting to the inner periphery side. Both ends of the inner peripheral surface 72C in the X-direction respectively match with an inner-periphery side lower end portion of the first region 20A and an inner-periphery side lower end portion of the first region 30A.

In the examples illustrated in FIG. 12 and FIG. 13, the first portion 80 has the same structure as that of the seal ring 10A illustrated in FIG. 1 to FIG. 3. However, the first portion 80 may be suitably replaced by a portion partially cut out in the circumferential direction C from the seal rings 10B, 10C, 10D, and 10H exemplified in FIG. 8 to FIG. 10 and FIG. 14 which are referred to later. In this case, the first side surface 20 and the second side surface 30 of the second portion 82 may be formed so as to be respectively flush with the first side surface 20 and the second side surface 30 of the replaced first portion 80, or may be formed so as not to be flush therewith.

A sectional shape of the annular groove 322 may be the rectangular shape as described above, but may also be a U-like shape. Specifically, a bottom wall surface profile line of a bottom wall surface 322B of the annular groove 322 on a cross section of the shaft member 320, which is orthogonal to the circumferential direction, may have an arc shape having a center point of the arc on an outer periphery side of the shaft member 320 with respect to the bottom wall surface profile line. In this case, as in a case of the seal ring 10H (10) illustrated in FIG. 14, it is preferred that an inner peripheral surface profile line of the inner peripheral surface 70 on a cross section orthogonal to the circumferential direction C of the seal ring 10H have an arc shape having a center point of the arc on the outer periphery side of the seal ring 10H in the radial direction D with respect to the inner peripheral surface profile line. The seal ring 10H illustrated in FIG. 14 is a seal ring having the same dimensions and shape as those of the seal ring 10A illustrated in FIG. 3 except for the inner peripheral surface 70 being the arc surface having the U-like cross section instead of being a flat surface.

Figure 14:
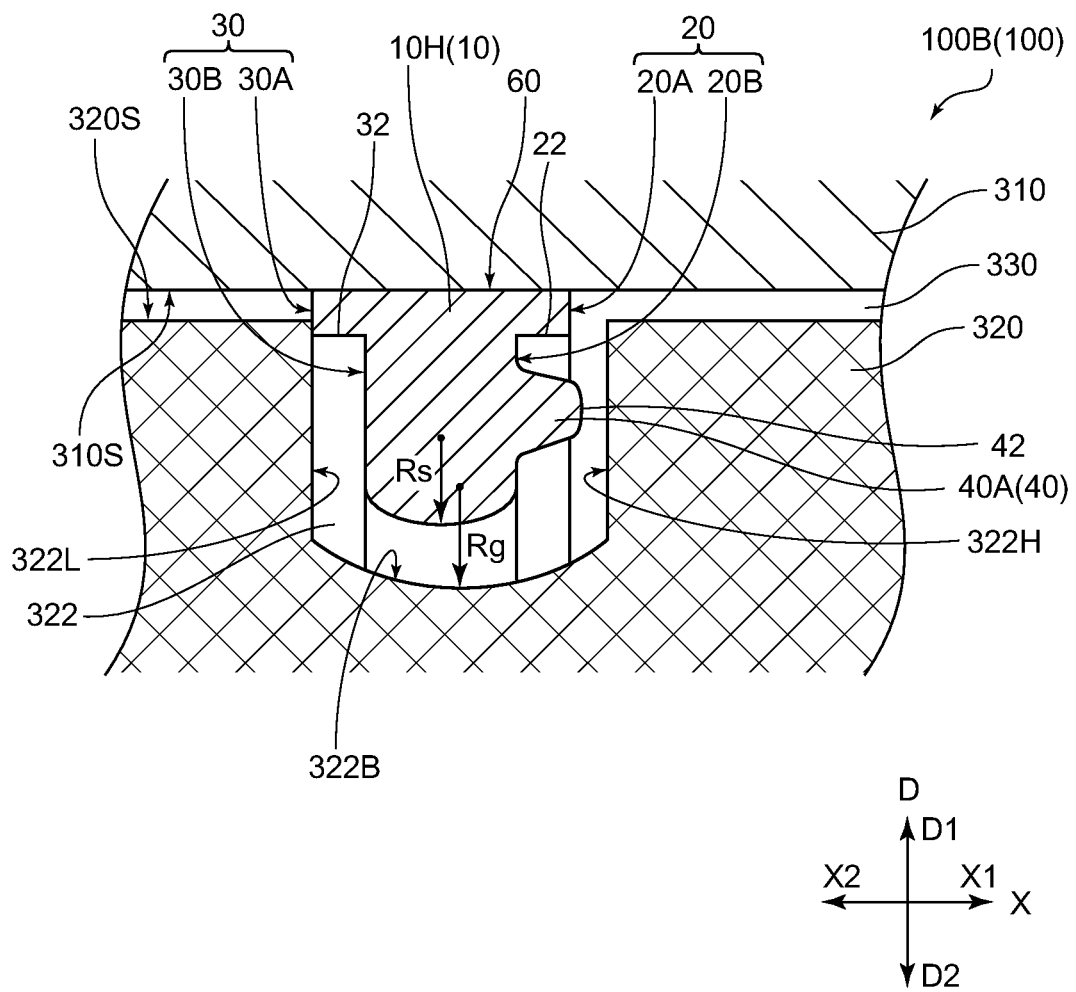
FIG. 14 is a schematic sectional view for illustrating a combination of another example of the seal ring and another example of an annular groove according to this embodiment.

In a sealing device 100B (100) illustrated in FIG. 14, which includes a combination of the annular groove 322 and the seal ring 10H, the fluid flowing between the first side surface 20, the inner peripheral surface 70 and the second side surface 30 of the seal ring 10, and the side wall surface 322H, the bottom wall surface 322B and the side wall surface 322L of the annular groove 322 is liable to form a laminar flow, thereby improving flowability of the fluid. Thus, as compared to the sealing device 100A illustrated in FIG. 4 to FIG. 6, which includes a combination of the annular groove 322 and the seal ring 10A, the seal ring 10H can be moved to the housing 310 side within a shorter period of time after activation of the pump, in the sealing device 100B illustrated in FIG. 14 which includes the combination of the annular groove 322 and the seal ring 10H. In terms of more effective fulfillment of the above-mentioned effect, it is preferred that Expression (5) be further satisfied.

$$Rg \geq Rs \qquad \text{Expression (5)}$$

In Expression (5), Rg is a curvature radius of the groove bottom surface profile line of the annular groove 322, and Rs is a curvature radius of the inner peripheral surface profile line of the seal ring 10H.

The seal ring 10 of this embodiment may further include an engagement portion (ring-side engagement portion) configured to fix the seal ring 10 to the member (the shaft member 320 or the housing 310) having the annular groove 322 in which the seal ring 10 is mounted, as needed. In this case, an engagement portion (groove-side engagement portion) corresponding to the ring-side engagement portion is formed on an inner wall surface of at least any one selected from the side wall surface 322L, the side wall surface 322H, and the bottom wall surface 322B of the annular groove 322.

For example, when a projecting portion is formed on the inner wall surface corresponding to any of the side wall surface 322L, the side wall surface 322H, and the bottom wall surface 322B as the groove-side engagement portion, the ring-side engagement portion formed of a recessed portion to be fitted over the groove-side engagement portion can be formed. Further, when a recessed portion is formed on the inner wall surface corresponding to any of the side wall surface 322L, the side wall surface 322H, and the bottom wall surface 322B as the groove-side engagement portion, the ring-side engagement portion formed of a projecting portion having a shape to be fitted into the groove-side engagement portion can be formed.

In order to reliably fix the seal ring 10 to the member having the annular groove 322 formed thereon by fitting the engagement portion formed of the projecting portion and the engagement portion formed of the recessed portion to each other, a projection height of the engagement portion formed of the projecting portion and a depth of the engagement portion formed of the recessed portion are required to be at least equal to or larger than 0.6 mm. When the projection height of the engagement portion formed of the projecting portion and the depth of the engagement portion formed of the recessed portion are smaller than 0.6 mm, the fitting between the ring-side engagement portion and the groove-side engagement portion is easily released, failing to fix the seal ring 10 to the member having the annular groove 322 formed therein.

For example, when the ring-side engagement portion formed of the projecting portion is formed on the first side surface 20 of the seal ring 10, a projection height HE of the ring-side engagement portion formed of the projecting portion is obtained by defining the height of the first reference plane SP1 as 0 mm. Specifically, the projection height HE of the ring-side engagement portion formed of the projecting portion is a distance from the first reference plane SP1 in the direction (X-direction) parallel to the center axis A1 of the seal ring 10 to a distal end portion of the ring-side engagement portion formed of the projecting portion.

Here, a sum of the standard width SWS and the projection height HE needs to be a value larger than the width GW of the annular groove as expressed by Expression (C) so that the ring-side engagement portion formed of the projecting portion formed on the first side surface 20 of the seal ring 10 is engageable with the groove-side engagement portion formed of the recessed portion formed on the side wall surface 322H of the annular groove 322. This is because, when Expression (C) is not satisfied, the ring-side engagement portion is easily disengaged from the groove-side engagement portion even after the ring-side engagement portion formed of the projecting portion and the groove-side engagement portion formed of the recessed portion are engaged with each other.

$$GW<HE+SWS \qquad \text{Expression (C)}$$

In Expression (C), the width GW of the annular groove 322 corresponds to a width of a portion on which the groove-side engagement portion formed of the recessed portion is not formed.

For reference, the projection height H1 of the first side-surface side projecting portion 40 satisfies Expression (D).

$$GW \geq H1+SWS \qquad \text{•Expression (D)}$$

As is apparent from Expression (D), the first side-surface side projecting portions 40 are neither used for the engagement with the member having the annular groove 322 in which the seal ring 10 is mounted nor have a function as the ring-side engagement portion formed of the projecting portion. It is more preferred that the projection height H1 satisfy a relational expression of GW>H1+SWS. Further, the ring-side engagement portion formed of the projecting portion is formed in addition to the first side-surface side projecting portions 40 on the first side surface 20, HE>H1 is always satisfied.

Although the number of the ring-side engagement portion and the number of the groove-side engagement portion are not particularly limited, it is generally preferred that only one ring-side engagement portion be formed on the seal ring 10 and that only one groove-side engagement portion be formed on the annular groove 322. When the ring-side engagement portion is not formed on the seal ring 10 and the groove-side engagement portion is not formed on the annular groove 322, each of the side wall surface 322L, the side wall surface 322H, and the bottom wall surface 322B of the annular groove 322 is generally formed as a flush surface without protrusions and recesses over the entire periphery in the circumferential direction C.

In the sealing device 100 of this embodiment, through use of the seal ring 10 of this embodiment including the first side-surface side projecting portions 40 formed on the first side surface 20, the sealing function for the fluid can be fulfilled within a short period of time after activation of the pump. In order to obtain similar effects, however, a seal ring without the first side-surface side projecting portions 40 on the first side surface 20 and a spacer having substantially the same functions as those of the first side-surface side projecting portions 40 can be used in combination in place of the seal ring 10 of this embodiment.

Figure 15:
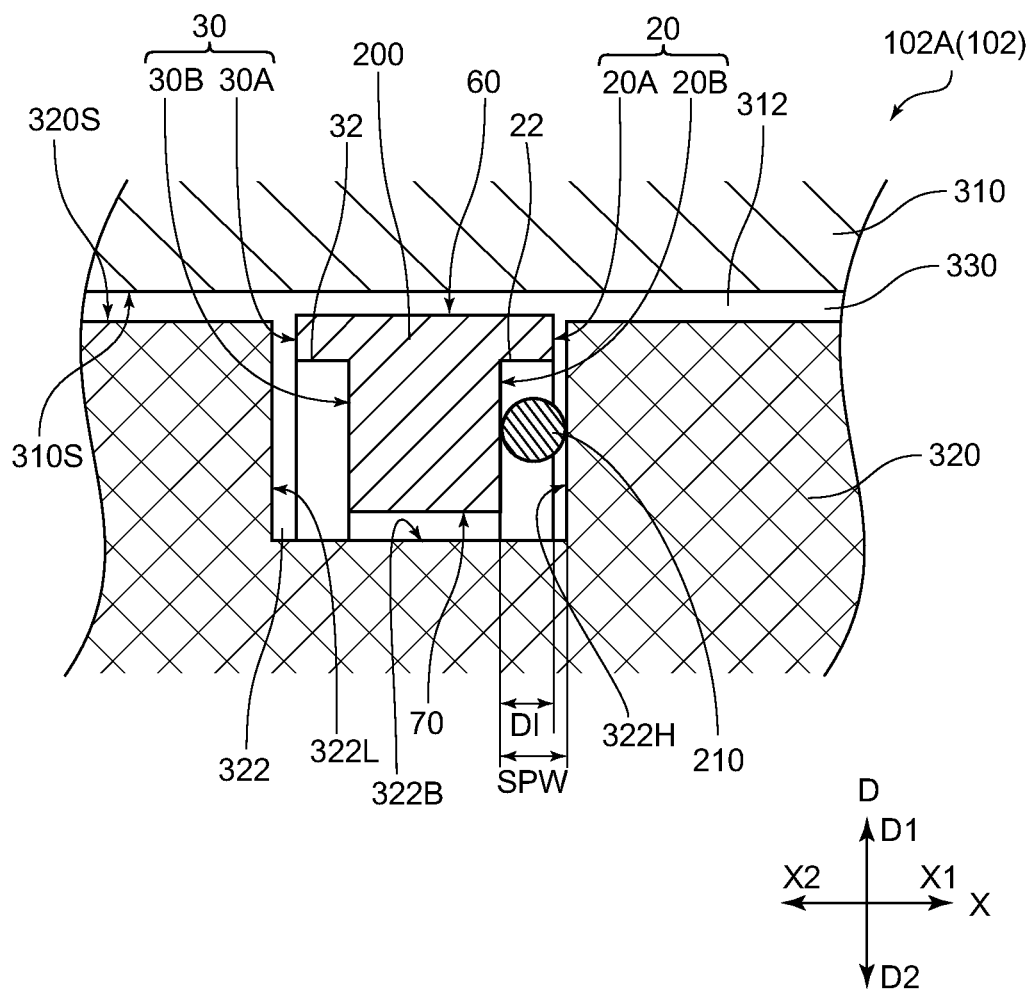
FIG. 15 is a schematic sectional view for illustrating a modification example of the sealing device according to this embodiment.
Figure 16:
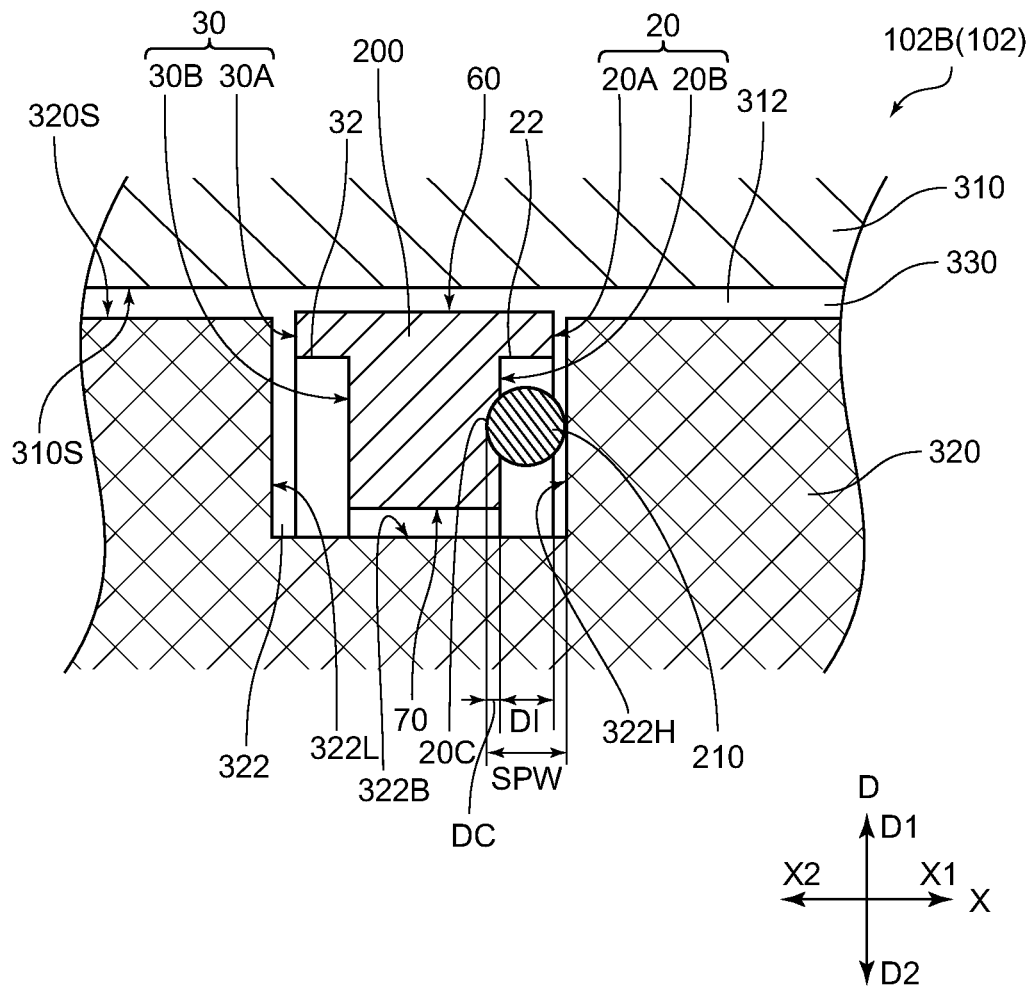
FIG. 16 is a schematic sectional view for illustrating a modification example of the sealing device according to this embodiment.

FIG. 15 and FIG. 16 are schematic sectional views for illustrating modification examples of the sealing device of this embodiment. A sealing device 102A (102) illustrated in FIG. 15 further includes a spacer 210 arranged between the first side surface 20 of a seal ring 200 and the side wall surface 322H in addition to the related-art sealing device 300 illustrated in FIG. 18 to FIG. 20. The spacer 210 is arranged between the second region 20B of the first side surface 20 and the side wall surface 322H. A maximum length SPW thereof in the direction (X-direction) parallel to the center axis of the shaft member 320 is set to a value larger than the level-difference portion height DI of the level-difference portion 22. In other words, the maximum length SPW of the spacer 210 is set to a value with which a state in which the first side surface 20 of the seal ring 200 and the side wall surface 322H of the annular groove 322 are reliably separated from each other can be maintained under a state in which the spacer 210 is brought into the upright state in the annular groove 322. Therefore, the spacer 210 can fulfill substantially the same functions as those of the first side-surface side projecting portions 40 formed on the first side surface 20 of the seal ring 10 of this embodiment. Any member can be used as the spacer 210 as long as substantially the same functions as those of the first side-surface side projecting portions 40 are fulfilled. For example, an O-ring, a coil expander, and the like can be used.

It is more preferred that a concave portion be formed on the first side surface 20 of the seal ring 200 so as to suppress a positional shift of the spacer 210 in the radial direction D. For example, as in a case of a sealing device 102B (102) illustrated in FIG. 16, a concave portion 20C can be formed on the second region 20B of the first side surface 20. In this case, the maximum length SPW of the space 210 is set to a value larger than a total length of the level-difference portion height DI and a depth DC of the concave portion 20C. Except for the above-mentioned points, the sealing device 102B illustrated in FIG. 16 has the same configuration as that of the sealing device 102A illustrated in FIG. 15.

A constituent material for the seal ring 10 according to this embodiment is not particularly limited, and for example, in addition to polyether ether ketone (PEEK), polyphenylene sulfide (PPS), polyimide (PI), polyamide imide (PAI), or the like, a resin material, for example, a fluorine-based resin, such as polytetrafluoroethylene (PTFE), modified polytetrafluoroethylene, or ethylene tetrafluoroethylene (ETFE), or a material obtained by filling the resin material with an additive, such as carbon powder, a reinforcing fiber, or a solid lubricant, is preferably used. Although mechanical features of the construction material of the seal ring 10 are not particularly limited, it is preferred that a Young's modulus be low. In the sealing device 100 using the seal ring 10 made of a material having a low Young's modulus, high followability to the seal ring 10 is provided. Thus, after activation of the pump, the fulfillment of the sealing function within a shorter period of time can be easily achieved.

Further, a method of manufacturing the seal ring 10 of this embodiment is not particularly limited. When a thermoplastic resin, for example, PEEK, PPS, PI, or the like is used as the construction material of the seal ring 10, however, it is preferred that the seal ring 10 be manufactured by injection molding. Further, when the fluorine resin is used as the construction material of the seal ring 10, the seal ring 10 can be manufactured by machine processing of a raw material after compression molding. Further, although any publicly-known liquids may be used as the fluid used for the sealing devices 100 and 102 of this embodiment, the working oil is used in general.

Although purposes of use of the seal ring 10 and the sealing device 100 of this embodiment are not particularly limited, it is suitable that the seal ring 10 and the sealing device 100 be used for a purpose of use that requires the fulfillment of the sealing function within a short period of time after activation of the pump. As a representative example, a transmission for an automobile employing idling stop is given. However, it is apparent that the seal ring 10 and the sealing device 100 of this embodiment can be suitably used for any purpose of use that requires the fulfillment of the sealing function for the fluid within a short period of time in addition to the purpose of use described above.

When the seal ring 10 of this embodiment is used so as to be mounted in the annular groove 322 formed in the housing 310 side, the description of the dimensions, size, and the like of the inner periphery side in the description of the present application is read as that of the dimensions, size, and the like of the outer periphery side, and the description of the dimensions, size, and the like of the outer periphery side in the description of the present application is read as that of the dimensions, size, and the like of the inner periphery side.

EXAMPLES

Now, the present invention is described in detail by way of examples, but the present invention is not limited to the examples to be described below.

<Evaluation of Seal Rings>

For evaluation of seal rings of Examples and Comparative Examples, a test device 400 illustrated in FIG. 17 was used. The test device 400 is a test device simulating the sealing devices 100A, 102, and 300. The test device 400 mainly includes a cylindrical member 410 corresponding to the housing 310 and a composite disc member 420 corresponding to the shaft member 320. The composite disc member 420 includes two discs 420A and a disc 420B. The disc 420B has a diameter smaller than that of the discs 420A and is sandwiched between the two discs 420A. Each of these three discs 420A and 420B has a shaft hole (not shown) formed in a radial center portion thereof, and is connected to a rotary shaft coupled to a motor (not shown) through the shaft hole. The seal ring 10A of this embodiment illustrated in FIG. 3 is exemplified in the example illustrated in FIG. 17. In actual tests, however, the seal rings of Examples and Comparative Examples were used for each test.

On an outer periphery of the composite disc member 420, an annular groove 422 having side surfaces of the discs 420A as side wall surfaces 422H and 422L and an outer peripheral surface of the disc 420B as a bottom wall surface 422B is formed. The annular groove 422 corresponds to the annular groove 322 of the sealing devices 100A, 102, and 200. An annular gap 430 is formed between the cylindrical member 410 and the composite disc member 420.

One side (X1-direction side) and another side (X2-direction side) of the annular gap 430 through the annular groove 422 therebetween are respectively connected to a hydraulic pump and an oil tank via a pressure regulating valve, a three-way valve (not shown), and the like. Through use of a hydraulic sensor (not shown), a hydraulic pressure S1 on the one side (X1-direction side) of the annular gap 430 and a hydraulic pressure S2 on the another side (X2-direction side) with respect to the annular groove 422 can be measured. Further, based on the hydraulic pressures S1 and S2 (actual measurement values), a differential pressure ΔS (=S1−S2, actual measurement value) can be obtained at the same time.

After the hydraulic pump was activated, time (achievement time) to the fulfillment of the sealing function for the working oil was measured in the following procedure.

Figure 17A:
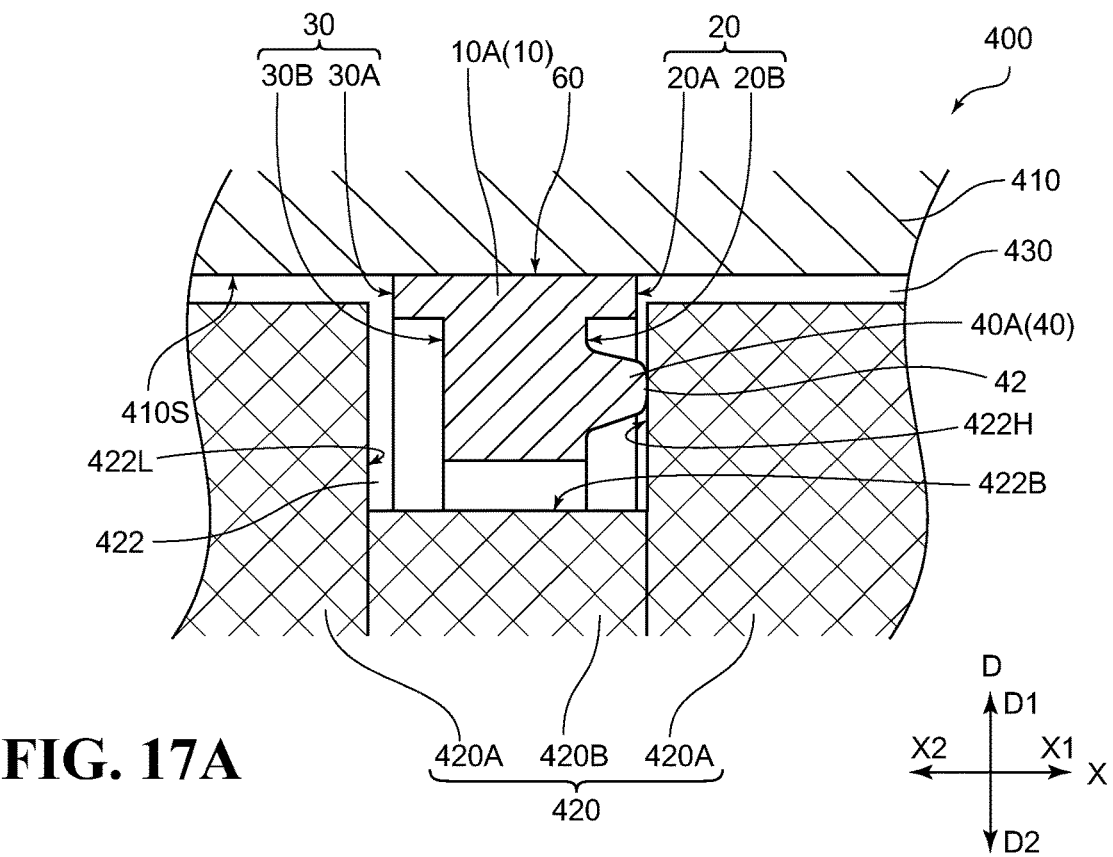
FIG. 17(A) is a view for illustrating a state immediately before start of measurement of achievement time.
Figure 17B:
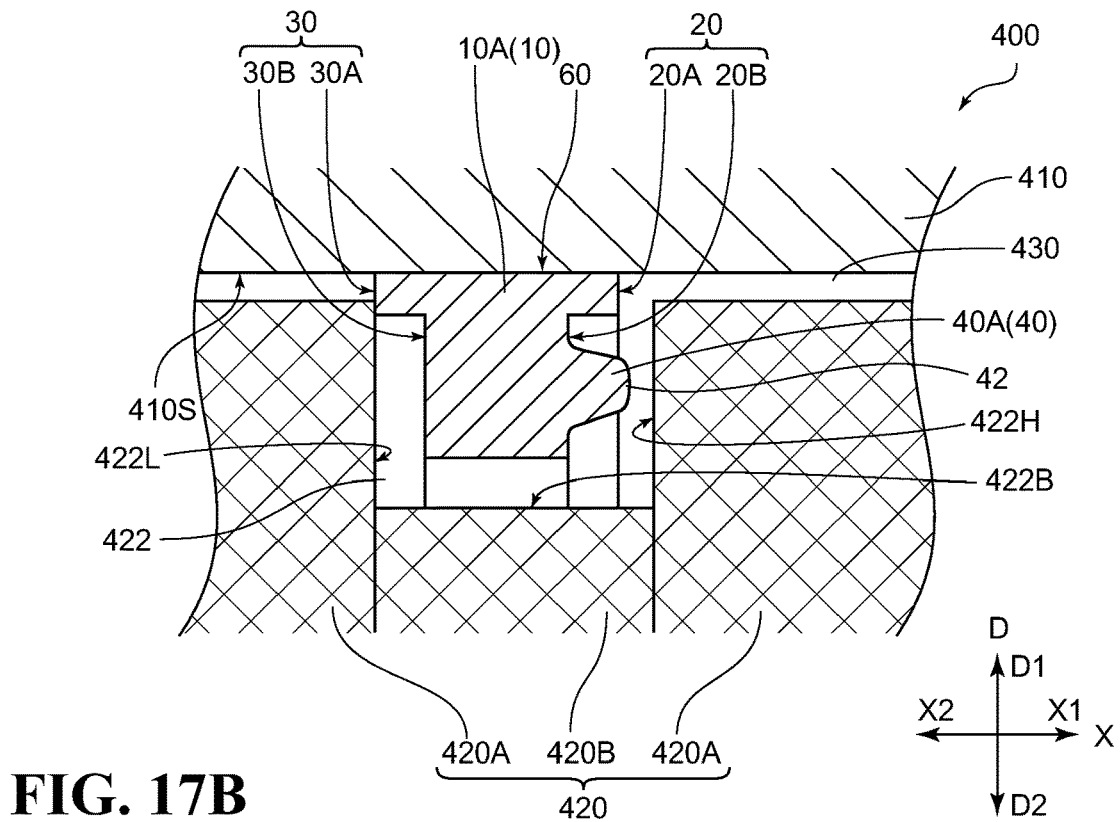
FIG. 17(B) is a view for illustrating a state immediately after the measurement of the achievement time (state in which the sealing function is perfectly fulfilled so that a differential pressure ΔS (actual measurement value) matches with a set value).

First, as illustrated in FIG. 17(A), the hydraulic pressure P2 (set value) of the hydraulic pump (not shown) connected to the X2-direction side of the annular gap 430 was regulated so as to be 0.1 MPa. Then, the working oil was supplied from the another side (X2-direction side) of the annular gap 430 to move the seal ring until at least any portion (the distal end portion 42 of the first side-surface side projecting portion 40A in the example illustrated in FIG. 17(A)) of the first side surface 20 of the seal ring was brought into contact with the side wall surface 422H. Next, the hydraulic pressure P2 (set value) was adjusted so as to become 0.02 MPa. Then, it was awaited for 10 seconds to 15 seconds until the hydraulic pressure S1 (actual measurement value) in a vicinity of the seal ring on the one side (X1-direction side) of the annular gap 430 became 0.02 MPa, specifically, the differential pressure ΔS (actual measurement value)=0 was achieved. During the waiting time, the hydraulic pressure S2 (actual measurement value) in the vicinity of the seal ring on the another side (X2-direction side) of the annular gap 430 was maintained at 0.02 MPa.

When the differential pressure ΔS (actual measurement value)=0 was achieved, measurement of the differential pressure ΔS (actual measurement value) and the hydraulic pressure S2 (actual measurement value) was started at intervals of 0.01 second, and at the same time, recording on a data logger was started. It is noted that data of the hydraulic pressure and the differential pressure was recorded in voltage in the data logger. After elapse of about 0.5 second to one second from the start of the measurement of the differential pressure ΔS (actual measurement value) and the hydraulic pressure S2 (actual measurement value), the hydraulic pressure P1 (set value) of the hydraulic pump (not shown) connected to the X1-direction side of the annular gap 430 was set to 0.3 MPa to supply the working oil. A purpose of delaying the activation of the hydraulic pump by about 0.5 second to 1 second was to reliably record data with the differential pressure ΔS (actual measurement value) obtained by the hydraulic sensor being zero in the data logger. In this manner, as exemplified in FIG. 17(B), the second side surface 30 of the seal ring was brought into close contact with the side wall surface 422L, and the outer peripheral surface 60 was brought into close contact with an inner peripheral surface 410S of the cylindrical member 410. As a result, the seal ring fulfilled the sealing function for the working oil. At the same time, the differential pressure ΔS (actual measurement value) rose to be higher than 0. From the record in the data logger, time periods required for the differential pressure ΔS (actual measurement value) to reach 0.05 MPa and 0.10 MPa were obtained.

For the measurement of achievement time, in the data recorded in the data logger, elapsed time at a final time point at which a numerical value smaller than "0 (zero)" MPa disappeared after the rise of the differential pressure ΔS (actual measurement value) was set to a reference time (0 second). A time period from the reference time to a time point at which data smaller than "0.05" MPa disappeared from the data of the differential pressure ΔS (actual measurement value) data was obtained as the achievement time at the differential pressure ΔS equal to 0.05 MPa, and a time period from the reference time to a time point at which data smaller than "0.10" MPa disappeared from the data of the differential pressure ΔS (actual measurement value) data was obtained as the achievement time at the differential pressure ΔS equal to 0.10 MPa. It is noted that the differential pressure ΔS (actual measurement value) data was rounded off to two decimal places.

For the measurement of the achievement time, the measurement was carried out for five times for each of Examples and Comparative Examples to calculate an average value thereof.

Details of test conditions except for the seal ring were as follows.

(1) Working oil (fluid)
  Type of working oil: automatic transmission fluid (ATF)
  Oil temperature: 80° C.
(2) Cylindrical member 410 (member simulating the housing 310)
  Material: JIS S45C
  Inner diameter of the shaft hole: 55 mm
  Arithmetic average roughness Ra of the inner peripheral surface 410S of the shaft hole: 0.3 µm
(3) Composite disc member 420 (member simulating the shaft member 320)
  Material: JIS S45C
  Outer diameter (outer diameter of each of the discs 420A): 54.4 mm
  Outer diameter of the bottom wall surface 422B (outer diameter of the disc 420B): 50.5 mm
  Arithmetic average roughness Ra of the side wall surfaces 422L and 422H of the annular groove 422: 0.3 µm
  Width GW of the annular groove 422 (thickness of the disc 420B): see Table 4
(4) Others
  Side clearance CL: see Table 4
  Maximum travel distance Z: see Table 4
  In the general sealing device 100 used for a transmission for an automobile or the like, a range of from about 0.10 mm to 0.25 mm is frequently used as the side clearance CL in general, and a range of from 0.10 mm to 0.20 mm is suitably used.

<Seal Rings>

Figure 21:
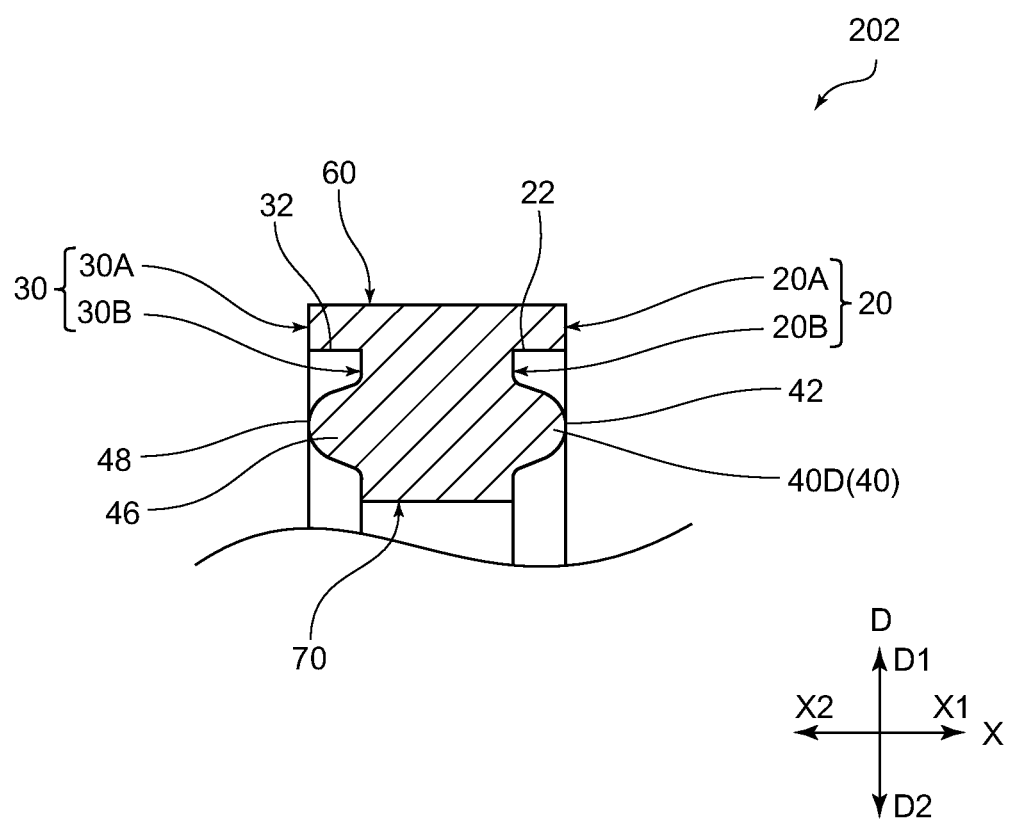
FIG. 21 is a schematic view of a seal ring of Comparative Example 3.

Details of dimensions and shapes of the seal rings used for the evaluation are shown in Table 1 to Table 3. Details of dimensions, shapes, materials, and the like of seal rings other than those shown in Table 1 to Table 3 are as follows.
  Material: PEEK material
  Outer diameter: 55 mm
  Thickness: 1.8 mm (thickness of the first portion 80 for Example 7)
  Thickness of portions corresponding to the first regions 20A and 30A: 0.7 mm (thickness of the first portion 80 for Example 7)
  Shape of the joint portion 50: composite step cut type
  Gap in the joint portion 50 when the seal ring is arranged so as to come into close contact with the inner peripheral surface 410S of the cylindrical member 410 simulating the housing 310: 0.5 mm For Comparative Example 3, a seal ring 202 illustrated in FIG. 21 was used. In comparison to the seal ring 200 illustrated in FIG. 18, the seal ring 202 has a bilaterally symmetric sectional structure including a first side-surface side projecting portion 40D (40) having the distal end portion 42 flush with the first region 20A, which is formed on the first side surface 20, and the second side-surface side projecting portion 46 having the distal end portion 48 flush with the first region 30A, which is formed on the second side surface 30.

For the seal rings of Examples and Comparative Examples, in each of which the first side-surface side projecting portions 40 were formed on the first side surface 20, the three first side-surface side projecting portions 40 were formed discretely in the circumferential direction C, as exemplified in FIG. 1. Further, except for Example 7, an angle of arrangement between the two first side-surface side projecting portions 40 formed on both sides of the joint portion 50 was set to 60°. Further, even for the seal rings of Examples and Comparative Examples in each of which the second side-surface side projecting portions 46 were formed on the second side surface 30, the three side-surface side projecting portions 46 were formed discretely in the circumferential direction C, and an angle of arrangement between the second side-surface side projecting portions 46 was set similarly to that of the first side-surface side projecting portions 40.

Further, for the seal ring of Example 7, an angle formed between the inner peripheral surface 72 and the outer peripheral surface 60 of the second portion 82 in the direction (X-direction) parallel to the center axis A1 was set to 30°. A length of the first portion 80A on which the first side-surface side projecting portion 40 was formed, a length of the first portion 80B on which the first side-surface side projecting portion 40 was not formed, and a length of the second portion 82 were set to 35°: 35°: 10° in spread angle in the circumferential direction C with the center axis A1 as a vertex. Three side-surface side projecting portions 40 were formed discretely in the circumferential direction C. Further, an angle of arrangement between the two first side-surface side projecting portions 40 formed on both sides of the joint portion 50 was set to 45°, and an angle of arrangement of the remaining one first side-surface side projecting portion 40 was set to 180° as in the case illustrated in FIG. 1.

<Results of Evaluations>

Results of evaluations are shown in Table 5. Evaluation criteria for a sealability evaluation, a mountability evaluation, and a projecting portion breakage resistance evaluation are as follows.

—Sealability Evaluation—

Sealability was evaluated based on the following criteria for a working oil differential-pressure achievement time ratio of each of Examples and Comparative Examples with $\Delta S=0.10$ MPa when a working oil differential-pressure achievement time of Comparative Example 1 with $\Delta S=0.10$ MPa was defined as 100.
A: working oil differential-pressure achievement time ratio is equal to or smaller than 80
B: working oil differential-pressure achievement time ratio is larger than 80 and equal to or smaller than 90
C: working oil differential-pressure achievement time ratio is larger than 90 and equal to or smaller than 100
D: working oil differential-pressure achievement time ratio is larger than 100.

—Mountability Evaluation—

The maximum travel distance Z of each of Examples and Comparative Examples was evaluated based on the following criteria.
A: $0.10 \text{ mm} \le Z < 0.20 \text{ mm}$
B: $0.03 \text{ mm} \le Z < 0.10 \text{ mm}$
C: $0 \text{ mm} < Z < 0.03 \text{ mm}$
D: $0.20 \text{ mm} \le Z$ or $Z=0 \text{ mm}$ —Projecting Portion Breakage Resistance Evaluation—

Figure 22:
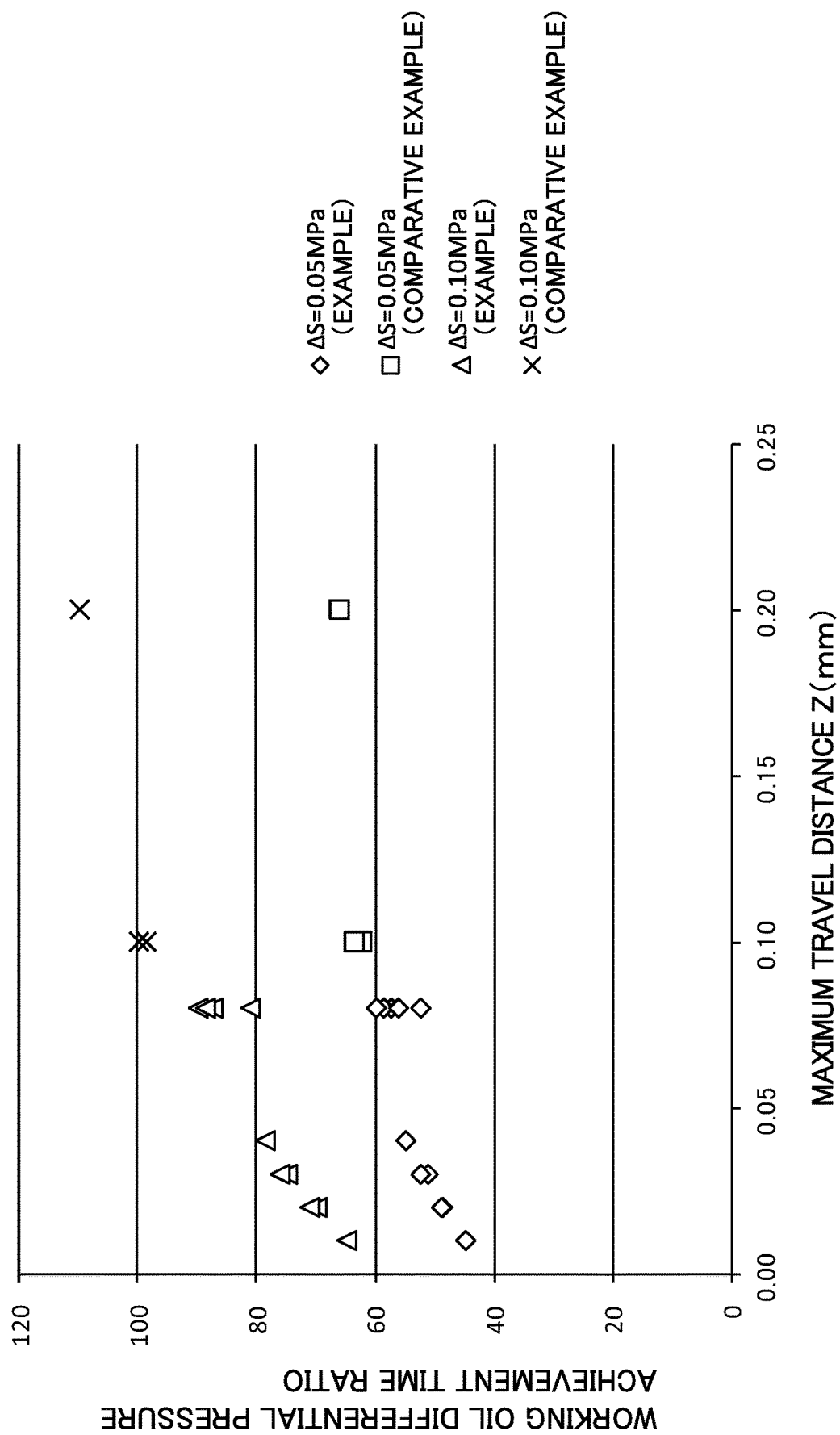
FIG. 22 is a graph obtained by plotting a working oil differential pressure achievement time ratio with respect to a maximum travel distance Z in each of Examples and Comparative Examples.

The projecting portion height H0 of the first side-surface side projecting portion 40 of each of Examples and Comparative Examples was evaluated based on the following criteria.
A: $0 \text{ mm} < H0 < 0.25 \text{ mm}$
B: $0.25 \text{ mm} < H0 < 0.50 \text{ mm}$
C: $0.50 \text{ mm} < H0$ For reference, FIG. 22 is a graph obtained by plotting the working oil differential-pressure achievement time ratio with respect to the maximum travel distance Z in each of Examples and Comparative Examples. As is apparent from FIG. 22, the working oil differential-pressure achievement time ratio was successfully shortened for all the seal rings of Examples in contrast to the seal rings of Comparative Examples.

TABLE 1

|  | Seal ring sectional shape (sectional shape of portion excluding first side-surface side projecting portions 40 and second side-surface side projecting portions 46) | Positions at which first side-surface side projecting portions 40 are formed | Positions at which second side-surface side projecting portions 46 are formed |
|---|---|---|---|
| Example 1 | FIG. 3 (T-shape type) | Second region 20B | No projecting portion |
| Example 2 | FIG. 3 (T-shape type) | Second region 20B | No projecting portion |
| Example 3 | FIG. 3 (T-shape type) | Second region 20B | No projecting portion |
| Example 4 | FIG. 3 (T-shape type) | Second region 20B | No projecting portion |
| Example 5 | FIG. 3 (T-shape type) | Second region 20B | No projecting portion |
| Example 6 | FIG. 10 (Innerperiphery side inverted trapezoid type) | Second region 20B | No projecting portion |
| Example 7 | First portion 80 — FIG. 3 (T-shape type); Second portion 82 — FIG. 12 | Second region 20B of first portion 80 | No projecting portion |
| Example 8 | FIG. 8 (T-shape type) | Second region 20B | Second region 30B |
| Example 9 | FIG. 3 (T-shape type) | Second region 20B | No projecting portion |
| Example 10 | FIG. 3 (T-shape type) | Second region 20B | No projecting portion |
| Example 11 | FIG. 9 (Rectangular type) | First side surface 20 | No projecting portion |
| Example 12 | FIG. 3 (T-shape type) | Second region 20B | No projecting portion |
| Comparative Example 1 | FIG. 18 (T-shape type) | No projecting portion | |
| Comparative Example 2 | FIG. 18 (T-shape type) | No projecting portion | |
| Comparative Example 3 | FIG. 21 (T-shape type) | Second region 20B | Second region 30B |

TABLE 2

|  | First side-surface side projecting portion 40 Sectional shape of distal end portion 42 | Second side-surface side projecting portion 46 Sectional shape of distal end portion 48 |
|---|---|---|
| Example 1 | FIG. 7 (A) | No projecting portion |
| Example 2 | FIG. 7 (A) | No projecting portion |
| Example 3 | FIG. 7 (B) | No projecting portion |
| Example 4 | FIG. 7 (A) | No projecting portion |
| Example 5 | FIG. 7 (A) | No projecting portion |
| Example 6 | FIG. 7 (A) | No projecting portion |
| Example 7 | FIG. 7 (A) | No projecting portion |
| Example 8 | FIG. 7 (A) | FIG. 7 (A) |
| Example 9 | FIG. 7 (A) | No projecting portion |
| Example 10 | FIG. 7 (A) | No projecting portion |
| Example 11 | FIG. 7 (A) | No projecting portion |
| Example 12 | FIG. 7 (A) | No projecting portion |
| Comparative Example 1 | No projecting portion | |
| Comparative Example 2 | No projecting portion | |
| Comparative Example 3 | FIG. 7 (A) | FIG. 7 (A) |

TABLE 3

| | Seal ring specifications | | | | | | |
|---|---|---|---|---|---|---|---|
| | Standard width SWS [mm] | Width of outer peripheral surface SWO [mm] | Width of inner peripheral surface SWI [mm] | Projection height H1 [mm] | Projecting portion height H0 [mm] | Curvature radius r [mm] | Level-difference portion height DI [mm] |
| Example 1 | 1.48 | 1.48 | 0.88 | 0.07 | 0.37 | 0.25 | 0.30 |
| Example 2 | 1.48 | 1.48 | 0.88 | 0.07 | 0.37 | 0.20 | 0.30 |
| Example 3 | 1.48 | 1.48 | 0.88 | 0.04 | 0.34 | — | 0.30 |
| Example 4 | 1.48 | 1.48 | 0.88 | 0.04 | 0.34 | 0.25 | 0.30 |
| Example 5 | 1.48 | 1.48 | 0.88 | 0.16 | 0.46 | 0.46 | 0.30 |
| Example 6 | 1.48 | 1.48 | 1.20 | 0.04 | 0.14 | 0.30 | — |
| Example 7 | 1.48 | 1.48 | 0.88 | 0.04 | 0.34 | 0.20 | 0.30 |
| Example 8 | 1.48 | 1.48 | 0.88 | 0.04 | 0.34 | 0.20 | 0.30 |
|  |  |  |  | 0.00 | 0.30 | 0.30 | 0.30 |
| Example 9 | 1.48 | 1.48 | 0.88 | 0.16 | 0.46 | 0.46 | 0.30 |
| Example 10 | 1.48 | 1.48 | 0.88 | 0.20 | 0.50 | 0.30 | 0.30 |
| Example 11 | 1.48 | 1.48 | 1.48 | 0.23 | 0.23 | 0.40 | — |
| Example 12 | 1.48 | 1.48 | 0.88 | 0.24 | 0.54 | 0.30 | 0.30 |
| Comparative Example 1 | 1.48 | 1.48 | 0.88 | No projecting portion | | | 0.30 |
| Comparative Example 2 | 1.48 | 1.48 | 0.88 | No projecting portion | | | 0.30 |

TABLE 3-continued

| | Seal ring specifications | | | | | | |
|---|---|---|---|---|---|---|---|
| | Standard width SWS [mm] | Width of outer peripheral surface SWO [mm] | Width of inner peripheral surface SWI [mm] | Projection height H1 [mm] | Projecting portion height H0 [mm] | Curvature radius r [mm] | Level-difference portion height DI [mm] |
| Comparative Example 3 | 1.48 | 1.48 | 0.88 | 0.00 0.00 | 0.30 0.30 | 0.50 0.50 | 0.30 0.30 |

(Remarks) In principle, H1, H0, and r are values relating to the first side-surface side projecting portions 40, and DI is a value relating to the first side surface 20. When H1, H0, r, and DI are listed separately in the upper row and the lower row, the values relating to the first side-surface side projecting portions 40 and the first side surface 20 are listed in the upper row, and values relating to the second side-surface side projecting portions 46 and the second side surface 30 are listed in lower row.

TABLE 4

| | Width of annular groove GW [mm] | Side clearance CL = GW − SWS [mm] | Maximum travel distance Z = CL − H1 [mm] |
|---|---|---|---|
| Example 1 | 1.58 | 0.10 | 0.03 |
| Example 2 | 1.58 | 0.10 | 0.03 |
| Example 3 | 1.60 | 0.12 | 0.08 |
| Example 4 | 1.60 | 0.12 | 0.08 |
| Example 5 | 1.72 | 0.24 | 0.08 |
| Example 6 | 1.60 | 0.12 | 0.08 |
| Example 7 | 1.60 | 0.12 | 0.08 |
| Example 8 | 1.60 | 0.12 | 0.08 |
| Example 9 | 1.68 | 0.20 | 0.04 |
| Example 10 | 1.70 | 0.22 | 0.02 |
| Example 11 | 1.73 | 0.25 | 0.02 |
| Example 12 | 1.73 | 0.25 | 0.01 |
| Comparative Example 1 | 1.58 | 0.10 | 0.10 |
| Comparative Example 2 | 1.68 | 0.20 | 0.20 |
| Comparative Example 3 | 1.58 | 0.10 | 0.10 |

(Remarks) The projection height H1 used for calculation of the maximum travel distance Z is a value of the first side-surface side projecting portions 40.

REFERENCE SIGNS LIST 10, 10A, 10B, 10C, 10D, 10E, 10F, 10G, 10H: seal ring
20: first side surface (side surface on high-pressure side)
20A: first region
20B: second region
20C: concave portion
22: level-difference portion
30: second side surface (side surface on low-pressure side)
30A: first region
30B: second region
32: level-difference portion
40, 40A, 40B, 40C, 40D: first side-surface side projecting portion (projecting portion on high-pressure side)
42: distal end portion
44: main body portion
46: second side-surface side projecting portion
48: distal end portion
50: joint portion
60: outer peripheral surface
70, 72, 72A, 72B, 72C: inner peripheral surface
80, 80A, 80B: first portion

TABLE 5

| | Working oil differential-pressure achievement time ratio | | Achievement time (s) | | Sealability evaluation | Mountability evaluation | Projecting portion breakage resistance evaluation |
|---|---|---|---|---|---|---|---|
| | ΔS = 0.05 MPa | ΔS = 0.10 MPa | ΔS = 0.05 MPa | ΔS = 0.10 MPa | | | |
| Example 1 | 51 | 75 | 0.41 | 0.60 | A | B | B |
| Example 2 | 53 | 76 | 0.42 | 0.61 | A | B | B |
| Example 3 | 58 | 90 | 0.46 | 0.72 | B | B | B |
| Example 4 | 60 | 88 | 0.48 | 0.70 | B | B | B |
| Example 5 | 59 | 89 | 0.47 | 0.71 | B | B | B |
| Example 6 | 56 | 88 | 0.45 | 0.70 | B | B | A |
| Example 7 | 53 | 81 | 0.42 | 0.65 | B | B | B |
| Example 8 | 60 | 89 | 0.48 | 0.71 | B | B | B |
| Example 9 | 55 | 79 | 0.44 | 0.63 | A | B | B |
| Example 10 | 49 | 70 | 0.39 | 0.56 | A | C | B |
| Example 11 | 49 | 71 | 0.39 | 0.57 | A | C | A |
| Example 12 | 45 | 65 | 0.36 | 0.52 | A | C | C |
| Comparative Example 1 | 63 | 100 | 0.50 | 0.80 | C | A | — |
| Comparative Example 2 | 66 | 110 | 0.53 | 0.88 | D | D | — |
| Comparative Example 3 | 64 | 99 | 0.51 | 0.79 | C | A | B |

(Remarks) The working oil differential-pressure achievement time ratio is evaluated based on the achievement time of Comparative Example 1 with ΔS = 0.10 MPa being defined as 100.

82: second portion
100, 100A, 100B, 102, 102A, 102B: sealing device
200, 202: seal ring
210: spacer
300: sealing device
310: housing
310S: inner peripheral surface
312: shaft hole
320: shaft member
320S: outer peripheral surface
322: annular groove
322B: bottom wall surface
322L, 322H: side wall surface
330: annular gap
400: test device
410: cylindrical member
410S: inner peripheral surface
420: composite disc member
420A, 420B: disc
422: annular groove
422B: bottom wall surface
422L, 422H: side wall surface
430: annular gap

The invention claimed is:

1. A seal ring, comprising:
a first side surface;
a second side surface on a side opposite to the first side surface; and
a first side-surface side projecting portion formed on the first side surface,
wherein a distal end portion of the first side-surface side projecting portion projects most toward an outward side from the first side surface as compared to an entire surface of the first side surface except for the distal end portion, and
wherein a sectional shape of a cross section of the seal ring, which is orthogonal to a circumferential direction of the seal ring, is asymmetric with respect to a radial center line that divides the sectional shape into two sides corresponding to one side and another side of a center axis of the seal ring,
wherein a width of an inner peripheral surface of the seal ring in a direction parallel to the center axis is smaller than a width of an outer peripheral surface of the seal ring, and
wherein the first side-surface side projecting portion is an only projecting portion formed on either of the first side surface or the second side surface.

2. A seal ring according to claim 1, wherein the first side-surface side projecting portion comprises three or more first side-surface side projection portions which are formed discretely in the circumferential direction of the seal ring.

3. A seal ring according to claim 1, wherein a sectional shape of a cross section of the distal end portion of the first side-surface side projecting portion, which is orthogonal to the circumferential direction, is an arc shape or a flat surface shape.

4. A seal ring according to claim 1, wherein a height H0 of the first side-surface side projecting portion is equal to or smaller than 0.5 mm.

5. A seal ring according to claim 1, wherein when a height of a plane which includes a region of the first side surface adjacent to an outer peripheral surface and is parallel to a radial direction of the seal ring, is defined as 0 mm, a projection height H1 of the first side-surface side projecting portion with respect to the plane is larger than 0 mm and equal to or smaller than 0.5 mm.

6. A sealing device, comprising:
a housing having a shaft hole;
a shaft member, which is arranged in the shaft hole and is configured to rotate relative to the housing; and
a seal ring, which is mounted in an annular groove formed in an outer peripheral surface of the shaft member and is configured to seal an annular gap formed between the shaft member and the housing,
wherein, when a fluid is pressure-fed into the annular groove, one side of a center axis of the shaft member becomes a high-pressure side and another side of the center axis of the shaft member becomes a low-pressure side,
wherein the seal ring comprises a high-pressure side projecting portion formed on a side surface of the seal ring on the high-pressure side,
wherein a distal end portion of the high-pressure side projecting portion projects most toward the high-pressure side as compared to an entire side surface on the high-pressure side except for the distal end portion, and
wherein a sectional shape of a cross section of the seal ring, which is orthogonal to a circumferential direction of the seal ring, is asymmetric with respect to a radial center line that divides the sectional shape into two sides corresponding to one side and another side of a center axis of the seal ring,
wherein a width of an inner peripheral surface of the seal ring in a direction parallel to the center axis is smaller than a width of an outer peripheral surface of the seal ring, and
wherein the high-pressure side projecting portion is formed on the side surface on the high-pressure side, and is an only projecting portion formed on either of a side surface on the low-pressure side or the side surface on the high-pressure side of the seal ring.

7. A sealing device according to claim 6, wherein the high-pressure side projecting portion comprises three or more high-pressure side projection portions which are formed discretely in the circumferential direction of the seal ring.

8. A sealing device according to claim 6, wherein a sectional shape of a cross section of the distal end portion of the high-pressure side projecting portion, which is orthogonal to the circumferential direction of the seal ring, is an arc shape or a flat surface shape.

9. A sealing device according to claim 6, wherein a height H0 of the high-pressure side projecting portion is equal to or smaller than 0.5 mm.

10. A sealing device according to claim 6, wherein when a height of a plane which includes a region of the side surface of the seal ring on the high-pressure side, and is parallel to a radial direction of the seal ring, is defined as 0 mm, a projection height H1 of the high-pressure side projecting portion with respect to the plane is larger than 0 mm and equal to or smaller than 0.5 mm.

* * * * *